US008972393B1

(12) United States Patent
Killalea et al.

(10) Patent No.: US 8,972,393 B1
(45) Date of Patent: *Mar. 3, 2015

(54) DISAMBIGUATION OF TERM MEANING

(75) Inventors: Tom Killalea, Seattle, WA (US); Janna S. Hamaker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/553,172

(22) Filed: Jul. 19, 2012

Related U.S. Application Data

(63) Continuation of application No. 12/826,980, filed on Jun. 30, 2010, now Pat. No. 8,250,071.

(51) Int. Cl.
*G06F 17/30* (2006.01)

(52) U.S. Cl.
USPC ............ 707/728; 707/726; 707/730; 707/749

(58) Field of Classification Search
CPC ............ G06F 17/30017; G06F 3/0488; G06F 17/30979; G06F 17/2785; G06F 17/30038; G06F 17/30616; G06F 17/28; G06F 17/30613; G06F 17/30663; G06F 17/2735; G06F 17/3064; G06F 17/3097
USPC .................................. 707/728, 726, 730, 749
See application file for complete search history.

(56) References Cited

U.S. PATENT DOCUMENTS

| | | | |
|---|---|---|---|
| 5,416,896 A | 5/1995 | Motoyama | |
| 5,483,629 A | 1/1996 | Motoyama et al. | |
| 5,745,776 A | 4/1998 | Sheppard, II | |
| 6,120,297 A | 9/2000 | Morse, III et al. | |
| 6,154,757 A | 11/2000 | Krause et al. | |
| 6,331,867 B1 | 12/2001 | Eberhard et al. | |
| 6,419,496 B1 | 7/2002 | Vaughan, Jr. | |
| 6,438,579 B1 | 8/2002 | Hosken | |
| 6,728,752 B1 | 4/2004 | Chen et al. | |
| 6,961,722 B1 | 11/2005 | Bruecken | |
| 7,814,112 B2 | 10/2010 | Gupta et al. | |
| 7,849,393 B1 | 12/2010 | Hendricks et al. | |
| 7,966,334 B1 | 6/2011 | Bezos et al. | |
| 8,099,660 B1 | 1/2012 | O'Sullivan et al. | |
| 8,118,224 B2 * | 2/2012 | Barsness et al. | 235/435 |
| 8,250,071 B1 * | 8/2012 | Killalea et al. | 707/728 |
| 8,286,885 B1 * | 10/2012 | Zehr et al. | 235/492 |
| 2002/0082939 A1 | 6/2002 | Clark et al. | |
| 2002/0120651 A1 * | 8/2002 | Pustejovsky et al. | 707/513 |
| 2003/0028564 A1 | 2/2003 | Sanfilippo | |

(Continued)

OTHER PUBLICATIONS

Office action for U.S. Appl. No. 12/729,913, mailed on Nov. 23, 2012, Berezhnyy et al., "Vocabulary Building of Words Identified During eBook Consumption", 19 pages.

(Continued)

*Primary Examiner* — Debbie Le
(74) *Attorney, Agent, or Firm* — Lee & Hayes, PLLC

(57) ABSTRACT

A meaning of a term is determined using the contents of a corpus of books through use of metadata about the books within the corpus, terms in the same work which provide context, and so forth. Users may query to determine the meaning of a term. Users may also build vocabulary skills by testing as well. A changing meaning of a term over time may be determined and utilized as well. Searches are facilitated by the enhanced ability to determine meaning of the terms, particularly in context. Feedback from the searches may also be used to refine future searches.

27 Claims, 20 Drawing Sheets

(56) References Cited

U.S. PATENT DOCUMENTS

| | | | |
|---|---|---|---|
| 2003/0160830 | A1 | 8/2003 | DeGross |
| 2004/0064369 | A1 | 4/2004 | Kato |
| 2004/0201633 | A1 | 10/2004 | Barsness et al. |
| 2004/0248653 | A1 | 12/2004 | Barros et al. |
| 2005/0060266 | A1 | 3/2005 | DeMello et al. |
| 2005/0069849 | A1 | 3/2005 | McKinney et al. |
| 2006/0041538 | A1 | 2/2006 | King et al. |
| 2006/0230340 | A1 | 10/2006 | Parsons et al. |
| 2006/0277046 | A1 | 12/2006 | Lachish et al. |
| 2006/0282778 | A1 | 12/2006 | Barsness et al. |
| 2007/0011160 | A1 | 1/2007 | Ferland et al. |
| 2007/0136231 | A1 | 6/2007 | Padmanabhan |
| 2007/0265834 | A1 | 11/2007 | Melnick |
| 2007/0269775 | A1 | 11/2007 | Andreev et al. |
| 2008/0082930 | A1 | 4/2008 | Omernick et al. |
| 2008/0141182 | A1 | 6/2008 | Barsness et al. |
| 2008/0222552 | A1 | 9/2008 | Batarseh et al. |
| 2009/0144051 | A1 | 6/2009 | Lee et al. |
| 2009/0246744 | A1 | 10/2009 | Lofthus et al. |
| 2010/0003659 | A1 | 1/2010 | Edmonds |
| 2010/0005087 | A1 | 1/2010 | Basco et al. |
| 2010/0020030 | A1 | 1/2010 | Kim et al. |
| 2010/0021871 | A1 | 1/2010 | Layng et al. |
| 2010/0128994 | A1 | 5/2010 | Zwolinski |
| 2010/0153440 | A1 | 6/2010 | Hubert |
| 2010/0245282 | A1 | 9/2010 | Lai |
| 2010/0273138 | A1 | 10/2010 | Edmonds et al. |
| 2010/0311030 | A1 | 12/2010 | He et al. |
| 2011/0018695 | A1 | 1/2011 | Bells et al. |
| 2011/0076654 | A1 | 3/2011 | Green et al. |
| 2011/0087955 | A1* | 4/2011 | Ho et al. ............ 715/230 |
| 2011/0123967 | A1 | 5/2011 | Perronnin et al. |
| 2011/0161073 | A1 | 6/2011 | Lesher et al. |
| 2011/0167350 | A1 | 7/2011 | Hoellwarth |
| 2011/0261030 | A1* | 10/2011 | Bullock ............ 345/204 |
| 2012/0005617 | A1* | 1/2012 | Lee et al. ............ 715/776 |
| 2012/0211438 | A1 | 8/2012 | Glover |
| 2012/0221972 | A1 | 8/2012 | Patterson et al. |
| 2012/0240081 | A1* | 9/2012 | Sim et al. ............ 715/811 |
| 2012/0240085 | A1 | 9/2012 | Sim et al. |

OTHER PUBLICATIONS

Websters, "Third New International Dictonary of the English Language", G.C. Merriam Company, Springfield Massachusetts, 1965, 2 pages.

Final Office Action for U.S. Appl. No. 12/730,187, mailed on Nov. 22, 2013, Oleksandr Y. Berezhnyy, "Vocabulary Builder", 16 pages.

Office action for U.S. Appl. No. 12/730,187, mailed on Mar. 26, 2013, Berezhnyy et al., "Vocabulary Builder", 17 pages.

Non-Final Office Action for U.S. Appl. No. 12/729,913, mailed on Jul. 30, 2012, Oleksandr Y. Berezhnyy et al., "Vocabulary Building of Words Identified During eBook Consumption", 18 pages.

Office Action for U.S. Appl. No. 12/729,913, mailed on Aug. 15, 2014, Oleksandr Y. Berezhnyy, "Vocabulary Building of Words Identified During eBook Consumption", 31 pages.

Final Office Action for U.S. Appl. No. 12/749,073, mailed on Oct. 9, 2013, Sailesh Rachabathuni, "Context-Sensitive Reference Works", 22 pages.

Haupt, "Fun and Functional. Interesting new consumer-technology products", Horizon Air Magazine, Mar. 2010, 8 pages.

Office action for U.S. Appl. No. 12/749,073, mailed on Jan. 20, 2012, Rachabathuni et al., "Context-Sensitive Reference Works", 25 pages.

Office action for U.S. Appl. No. 12/823,085, mailed on Feb. 1, 2013, Keller et al., "Refining Search Results Based on Touch Gestures", 17 pages.

Office action for U.S. Appl. No. 12/749,073, mailed on Jul. 5, 2012, Rachabathuni et al., "Context-Sensitive Reference Works", 22 pages.

Office action for U.S. Appl. No. 12/823,077, mailed on Oct. 9, 2012, Freed, "Surfacing Reference Work Entries on Touch-Sensitive Displays", 12 pages.

Office Action for U.S. Appl. No. 13/927,456, mailed on Nov. 20, 2013, Ian W. Freed, "Providing Reference Work Entries on Touch-Sensitive Displays", 12 pages.

Office Action for U.S. Appl. No. 13/042,185, mailed on Nov. 27, 2013, Sailesh Rachabathuni, "Dynamically Selecting Example Passages", 20 pages.

Non-Final Office Action for U.S. Appl. No. 13/042,185, mailed on Feb. 22, 2013, Sailesh Rachabathuni et al., "Dynamically Selecting Example Passages", 17 pages.

Final Office Action for U.S. Appl. No. 12/823,086, mailed on Mar. 7, 2014, Kevin E. Keller, "Surfacing Instances of a Selected Content Portion", 12 pages.

Office action for U.S. Appl. No. 12/729,913, mailed on Apr. 28, 2014, Berezhnyy et al., "Vocabulary Building of Words Identified During eBook Consumption", 22 pages.

Final Office Action for U.S. Appl. No. 13/042,185, mailed on Apr. 8, 2014, Sailesh Rachabathuni, "Dynamically Selecting Example Passages", 21 pages.

Office action for U.S. Appl. No. 12/749,073, mailed on Apr. 9, 2013, Rachabathuni et al., "Context-Sensitive Reference Works", 21 pages.

Office Action for U.S. Appl. No. 12/823,086, mailed on Jun. 2, 2014, Kevin E. Keller, "Surfacing Instances of a Selected Content Portion", 15 pages.

Office action for U.S. Appl. No. 12/823,086, mailed on Jun. 26, 2013, Keller, "Surfacing Instances of a Selected Content Portion", 15 pages.

Office action for U.S. Appl. No. 13/042,185, mailed on Jul. 18, 2013, Rachabathuni, "Dynamically Selecting Example Passages", 23 pages.

"Babylon 8 Translation Softwar and Dictionary Tool" retrieved on May 7, 2010 at <<http://www.babylon.com/>>, entire website, Babylon, 2 pages.

Office action for U.S. Appl. No. 12/823,086, mailed on Oct. 24, 2014, Kevin E. Keller, "Surfacing Instances of a Selected Content Portion", 16 pages.

Final Office Action for U.S. Appl. No. 12/729,913, mailed on Nov. 28, 2014, Oleksandr Y. Berezhnyy, Vocabulary Building of Words Identified During eBook Consumption, 25 pages.

* cited by examiner

DISAMBIGUATION OF TERM MEANING

CROSS-REFERENCE TO RELATED APPLICATION

This application is a continuation of, and claims priority to, co-pending, commonly owned U.S. patent application Ser. No. 12/826,980, filed on Jun. 30, 2010, and entitled "DISAMBIGUATION OF TERM MEANING" to inventors Tom Killalea, et al. The entire contents of the above Application are incorporated herein by reference.

BACKGROUND

Many people are consuming books in digital form through use of a wide variety of electronic devices. Among these electronic devices are electronic book reader devices, cellular telephones, personal digital assistants (PDAs), tablets, netbooks, and the like. As more electronic books (or "eBooks") become available, more readers are opting to read books in digital form over the traditional paper-based form. Consumption of eBooks on electronic devices affords more opportunities to observe how readers interact with the content. One key opportunity is to better understand readers' knowledge of terms and to find ways to improve reader comprehension.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
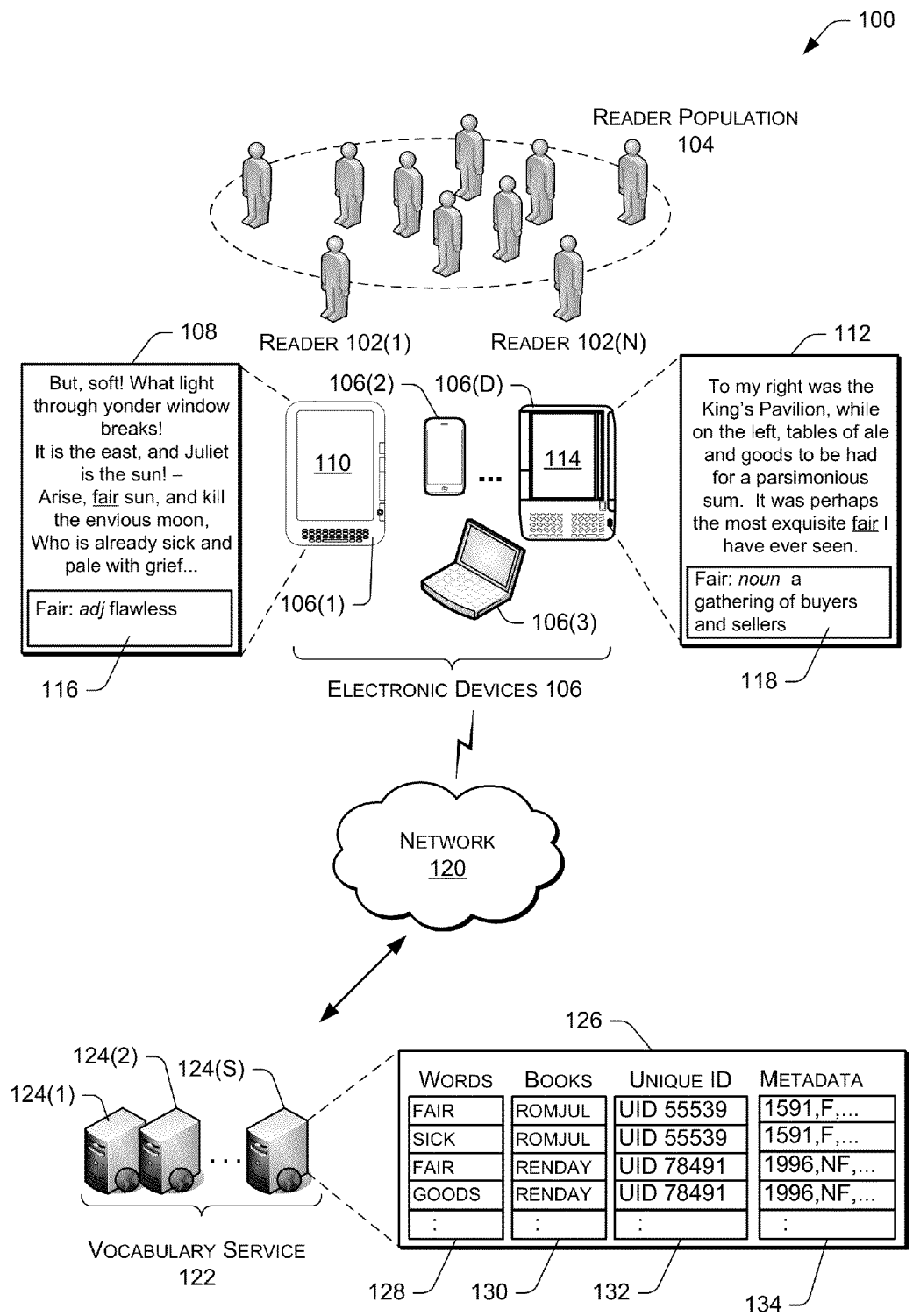
FIG. 1 illustrates an architecture in which terms from various electronic books (eBooks) deemed to be of interest to readers are collected by reader devices and aggregated at a remote service.

This disclosure describes enhancing a user's interaction with terms in content items such as electronic books (eBooks). The user initiates a query for a definition of a term such as a word or expression comprising a plurality of words. Based at least in part upon the context of the term, the resulting definition may be automatically disambiguated to provide a contextually accurate meaning. The disambiguation is aided, at least in part, by analyzing metadata associated with the content item, the term, the user, and so forth, as well as the content item in which the term and associated words are contained. Terms of interest may be stored and used to generate vocabulary questions to test the readers' comprehension of the terms.

A term may be deemed of interest when a reader requests a definition, highlights the term, annotates the term, or otherwise affirmatively interacts with the term through an electronic device on which the eBook is being consumed. The terms are captured by the electronic device as the reader consumes the eBook and stored locally and/or uploaded to a remote service from time-to-time.

In addition to a definition, a user may view examples of the term in excerpts from the corpus. Thus, the user sees the term in actual usage and is thus better able to build her own comprehension of the term.

Vocabulary questions test the readers understanding of the terms, particularly in the context of the eBooks from which the terms were extracted. The vocabulary questions may be crafted in any number of formats, such as true/false, open ended, or multiple-choice that includes the correct answer and one or more confounders. The vocabulary terms may be provided in the question, or as one of the possible answers. The vocabulary questions may be generated by users, automatically, or through other techniques, such as through use of a mechanical solutions network. The vocabulary questions may also be created by the electronic device or by the remote service.

The vocabulary questions are subsequently presented to the reader for consideration. The reader may enter responses to the questions, and the accuracy can be tracked and reported. Furthermore, as part of the feedback, the excerpts from the eBook, which contain the terms and formed the basis for the vocabulary questions, may be presented to the reader to provide the context and reinforce the learning process. The reader may be retested from time-to-time to evaluate retention of the vocabulary terms.

The vocabulary questions may further be evaluated by the reader. After learning the intended correct answer, the reader may be given an opportunity to comment on whether the vocabulary question was appropriate, inaccurate, correct, and so forth. In some instances, the vocabulary questions may be rated by a community of readers, leading to a "Wisdom of Crowds" effect where certain questions become more favorable than others for testing comprehension. Discussion forums may further be provided to facilitate community discussion of the vocabulary terms, questions, and answers, as well as other social dialog regarding the book.

In addition to building vocabulary through questions, discussion, and so forth, users may also have terms disambiguated. Different meanings for a term in a passage may be distinguished by ascertaining the period in which the term was used, social/cultural context, contents of the passage in which the term appears, and so forth. In addition to the vocabulary training discussed above, disambiguating a term is useful in a variety of situations. For example, students benefit from seeing use of the term in excerpts which are contemporaneous with a passage under study and have substantially the same meaning. Also, disambiguation when used against a corpus of data provides insight as to how the meaning of a term changes over time.

Furthermore, disambiguation of meaning improves searches by determining an intended meaning. For example, search terms are disambiguated to find a particular meaning of a term given the context in which the search term is used. Because many languages contain terms which may have many divergent (if not mutually exclusive) meanings depending upon their use, determining the intended meaning and searching for the intended meaning improves the relevance of search results.

For discussion purposes, the following discussion provides an exemplary environment in which vocabulary building may be implemented in the context of readers consuming eBooks via electronic devices. The terms "electronic book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc. However, certain concepts described herein are also applicable to other types of digital content items, such as music, audio books, video, and other content items that people watch, listens to, or otherwise experience.

Architectural Environment

FIG. 1 illustrates an example architecture 100 in which terms deemed to be of interest to readers during consumption of eBooks are collected by reader devices and aggregated at a remote service. Many readers 102(1), . . . , 102(N) are illustrated in FIG. 1 as belonging to a reader population 104. As shown, each reader 102(1)-(N) employs a corresponding electronic device 106(1), . . . , 106(D) to consume one or more eBooks. The electronic devices 106(1)-(D), or generally devices 106, are each capable of rendering, playing, or otherwise presenting the eBook or other content items. In this illustration, the electronic devices are embodied as a first type of eBook reader device 106(1), a multifunction communication device 106(2), and a second type of eBook reader device 106(D). While eBook reader devices and a communication device are illustrated, other types of electronic devices may be used to render eBooks, such as portable digital assistants (PDAs), cellular telephones, portable media players, tablet computers, netbooks, notebooks, desktop computers, and the like.

The first reader 102(1) employs the eBook reader device 106(1) to render an eBook version of William Shakespeare's classic, *Romeo and Juliet*. A portion of the eBook 108 is presented on the device's display 110. Here, the eBook portion 108 is the famous passage:

But, soft! What light through yonder window breaks! It is the east, and Juliet is the sun! —Arise, fair sun, and kill the envious moon, Who is already sick and pale with grief . . .

Similarly, a second reader 102(N) employs the eBook reader device 106(D) to render the following portion 112 of an eBook entitled Renaissance Day on the device's display 114:

To my right was the King's Pavilion, while on the left, tables of ale and goods to be had for a parsimonious sum. It was perhaps the most exquisite fair I have ever seen.

Each electronic device 106(1)-(D) provides controls (e.g., hardware and/or software controls) that enable a corresponding reader 102(1)-(N) to interact with the eBook during consumption. For instance, the devices 106 allow readers to select eBooks, turn pages, look up term definitions, highlight sections, annotate the work, access remote book stores, and so forth. Of particular interest are user interactions that can be interpreted as a reader's interest in one or more terms. This interest may be exhibited through requesting a definition, highlighting the term, adding a comment pertaining to the term, and so forth.

For instance, while reading the famous passage 108 displayed on eBook reader device 106(1), the reader 102(1) would like to better understand the use of the term "fair" in this particular work. Accordingly, the reader 102(1) uses the controls on the eBook reader device 106(1) to emphasize or otherwise select the term "fair" on the display 110, as indicated by the underlined term. In response, a definition box 116 is depicted at a bottom portion of the display 110 and the definition of the term "fair" as "flawless" is provided in the box 116. The definition engine may be invoked through express selection and entry of the term "fair" or by simply emphasizing the term in the text by hovering a pointer over the term, moving a cursor to the term, or through other UI selection techniques. In some implementations, the genre or context of the work may be considered when choosing among the definitions to provide to the reader. In this example, the term "fair" is extracted from the medieval work *Romeo and Juliet*, and proximate to the archaic term "yonder". Based on this information, the engine may order the definitions with the more likely selection of "fair" as pertaining to beauty—rather than weather, bias, or an event—ordered first.

Similarly, the second reader 102(N) might become curious about the term "fair" when passage 112 is displayed on the eBook reader device 106(D). Upon selecting the term "fair", a definition box 118 containing a definition of the term "fair" as "a gathering of buyers and sellers" is presented at the bottom of the display 114. Because of the different context present within the two passages 108 and 112, different definitions for the same term were provided which are context appropriate. For example, with regards to passage 108, various factors may be used to establish the context appropriate meaning of the term "fair." For example, the proximity of "fair" to the terms "yonder" as well as metadata of the book, such as the date of publication, may be lead to a correspondence within the definition engine of the use in this passage with the more archaic form indicating "flawless."

Similarly, the definition 118 of fair as a gathering of buyers and sellers may be ascertained based on the context in which that term appears. For example, the proximity of terms such as "tables", "goods" and "sum" to "fair" might indicate the topic as being one relating to commerce, thus corresponding within the definition engine to the definition given.

When a reader expresses interest in a term (e.g., seeking a definition, highlighting, annotating, etc.), the term is captured by the eBook reader device and stored in a file. The term is associated with the eBook from which it was extracted, and a unique identifier of the reader and/or device. In some implementations, the eBook reader device may be equipped with a question generator to create vocabulary questions for the terms captured and stored in the file. The vocabulary questions are intended to test the reader's comprehension of the terms. Such question generators are described below in more detail. However, in other implementations, the file with the terms is transferred to a remote service for construction of corresponding vocabulary questions.

Accordingly, the electronic reader devices 106(1)-(D) communicate via a network 120 to send files of terms to a vocabulary service 122, where the terms are stored in association with the eBooks and unique identifiers. The network 120 is representative of any one or combination of multiple different types of networks, such as the Internet, cable networks, wireless networks, and wired networks. In FIG. 1, the vocabulary service 122 is hosted on servers 124(1), 124(2), . . . , 124(S), which receive the terms deemed to be of interest from the electronic devices 106(1)-(D). The servers 124(1)-(S) have processing and storage capabilities to collect and store terms received from many readers in the population 104, and to generate vocabulary questions based on the terms. The servers 124(1)-(S) may be embodied in any number of ways, including as a single server, a cluster of servers, a server farm or data center, and so forth, although other server architectures (e.g., a mainframe architecture) may also be used.

The terms collected from the various eBook reader devices are stored in a data structure 126, as represented by the list of terms 128. The term list 128 includes the term "fair" that was captured by the eBook reader device 106(1) and the term "fair" that was captured by the eBook reader device 106(D). The terms are stored in association with the eBook identities 130 from which the terms were extracted, along with unique identifiers (or IDs) 132 that are unique to the readers 102(1)-(N) or to electronic devices 106. Metadata 134 may also be stored. The metadata is discussed below with regards to FIG. 2 in more detail. As shown here, the differing usage of the term "fair" as extracted from different eBooks (i.e., "ROM-JUL" and "RENDAY"), by different readers or devices as indicated by a different IDs associated with these terms.

Through this data structure 126, the vocabulary service 122 may perform various statistical analyses on the terms. For instance, the vocabulary service 122 may determine what meaning is to be attributed to a term in a given context, or how the meaning of the term has changed over a given time, within a genre, and so forth. The vocabulary service 122 may also determine which terms appear most often (i.e., those terms of most interest to the readers), or terms that are most frequently looked up, and so forth. The service can further compute these statistics relative to books, such as the most frequently cited terms in the eBook, or top ten books in which the term "fair" is looked up. Furthermore, similar statistics can be measured relative to the reader or eBook device. For example, the vocabulary service 122 may ascertain the reader's top ten terms most often looked up or highlighted.

Once terms are collected, the vocabulary service 122 can generate vocabulary questions designed to test a reader's comprehension of the terms. In particular, the vocabulary service 122 can create questions that take into account the context from the eBook from which the term was extracted. In this manner, the data structure 126 may further include excerpts of the eBooks that include surrounding text portions encompassing the terms of interest.

Figure 2:
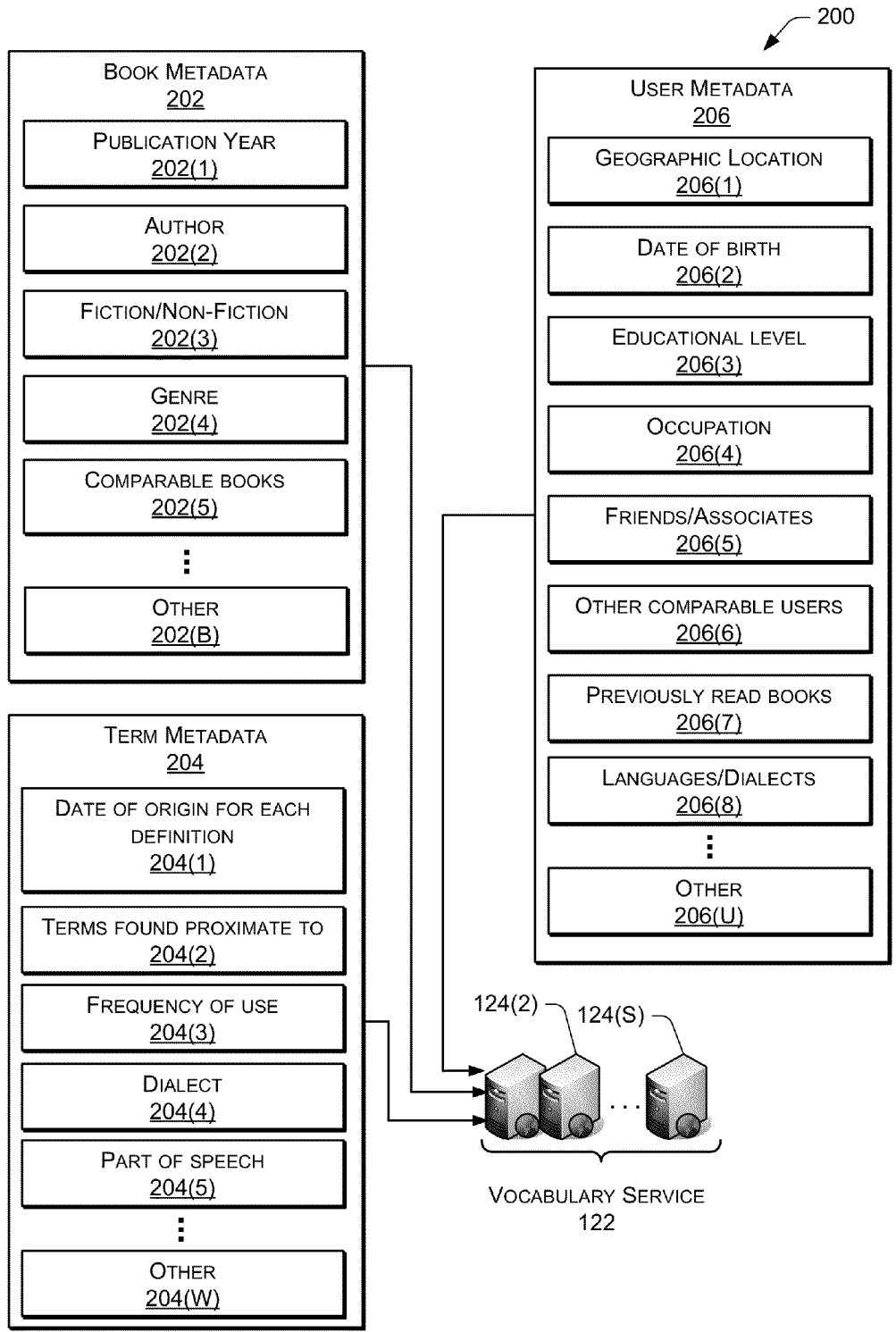
FIG. 2 illustrates metadata which may be used by the architecture of FIG. 1.

FIG. 2 illustrates metadata 200 which may be used by the architecture of FIG. 1. In addition to the contents of the eBooks themselves, data about the works, or metadata, may be used to determine context and relevant correspondences between terms, eBooks, users, and so forth.

Book metadata 202 may be accessed by the vocabulary service 122 for analysis. The book metadata may include a publication year 202(1) indicating when the eBook, either in physical printed or electronic form, or was otherwise published. An author or authors 202(2) may be stored, as well as categories such as whether the book is fiction or non-fiction 202(3), genre 202(4), and so forth. Other, comparable books 202(5) such as other books in a series, books related by topic, and so forth, may be stored. Other data 202(B) such as topic, sales volume, user ratings, number of revisions or editions, and so forth may also be maintained and used.

Metadata may also be stored within the vocabulary service 122 with regards to a particular target term, such as a single word or phrase. Term metadata 204 may include a date of origin for each definition 204(1), other terms which the target term or phrase are commonly proximate to 204(2), or frequency of use 204(3) for each definition. Dialect information 204(4), type of part of speech 204(5), may also be available. The term metadata 204 may include other data 204(W) such as rate of change of use, etymological information, and so forth.

User metadata 206 may also be used by the vocabulary service 122. The user metadata 206 may include a geographic location of the user 206(1), a date of birth 206(2), educational level 206(3), occupation 206(4), friends/associates or social network 206(5), other comparable users 206(6), books previously read by the user 206(7), preferred languages/dialects 206(8) known to the user, and other information 206(U).

Figure 3:
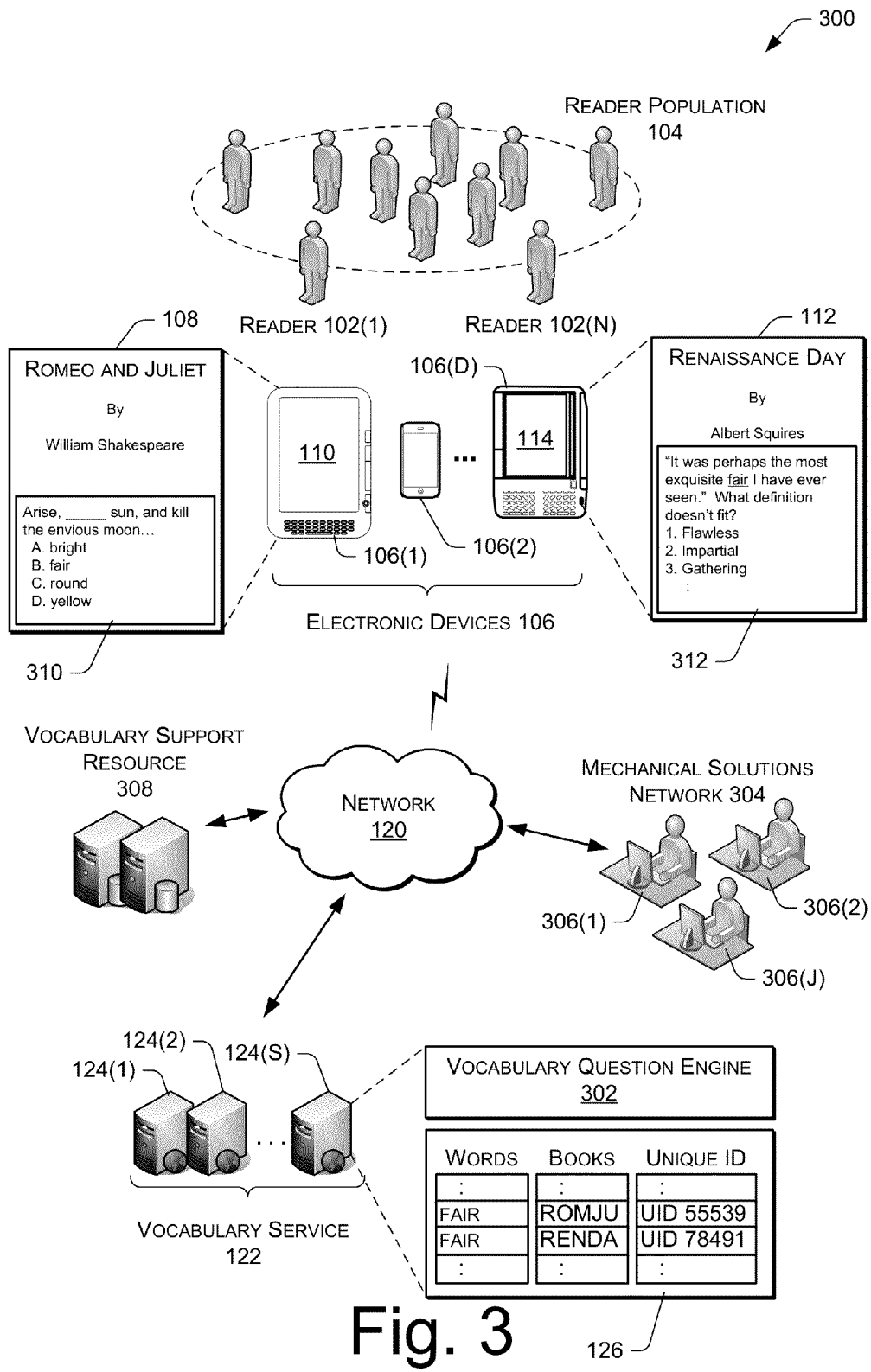
FIG. 3 illustrates an architecture in which vocabulary questions are generated based on the terms of interest collected in FIG. 1 to test the readers' comprehension of those terms.

FIG. 3 illustrates an example architecture 300 in which vocabulary questions are generated to test the readers' comprehension of the terms of interest. In architecture 300, the vocabulary questions are generated by the vocabulary service 122, although in some implementations, the questions may be created locally by the electronic devices 106. The vocabulary service 122 receives the terms from the electronic devices 106 over the network 120 and utilizes internal and external resources to generate the questions.

In one approach, the servers 124(1)-(S) implement a vocabulary question engine 302 to craft the vocabulary questions. The vocabulary question engine 302 evaluates the terms in the context of the eBooks within which the readers requested a definition or otherwise indicated an interest. The eBooks are identified in the data structure 126 by their association with the terms. The vocabulary question engine 302 extracts the passage from the eBook that contains the term of interest and parses the passage to ascertain the context. The vocabulary question engine 302 can then automatically generate a question based on the parsed passage. In one implementation, the engine 302 may simply extract the passage and ask the reader to fill in the blank. In another implementation, the vocabulary question may be formatted as multiple-choice, where the question restates the passage with a blank for the vocabulary term being tested, and provides multiple terms as possible answers. One of the answers is the term that is being tested. The remaining possibilities are confounders that are intended to provide plausibly legitimate, but incorrect, alternatives.

For instance, suppose the engine 302 receives the term "fair", which was indicated as being of interest to the reader 102(1) when reading the eBook passage from *Romeo and Juliet* in FIG. 1. Based on this input, the vocabulary service engine 302 might automatically craft the vocabulary question by extracting the passage from the associated eBook that contains the term to be tested and providing a set of confounders together with the correct answer, as follows:

Arise, sun, and kill the envious moon . . .
A. bright
B. fair
C. round
D. yellow Picking confounders (i.e., the incorrect responses) is non-trivial. Generally, the vocabulary question engine 302 will choose other terms with the same part of speech (e.g., if the term to be tested is an adjective, the confounder term is also an adjective). The engine 302 may further select synonyms and antonyms of the term being tested by the vocabulary question. Moreover, the genre or context of the work may be considered when choosing confounders. For instance, when the term "fair" is extracted from the work *Romeo and Juliet*, confounders that pertain to visual attributes (i.e., "fair" means flawless beauty in this context) may be selected as being more appropriate for this work and more likely to build the reader's vocabulary based on this period work. However, the term "fair" from another book, such as the passage 112 may involve different confounders pertaining to the idea of a gathering rather than visual attributes.

In another approach, the vocabulary service 122 may submit the terms and associated eBook passages to a mechanical solutions network 304 that utilizes human resources to draft the vocabulary questions or select appropriate definitions for a term in a particular context or passage. As shown here, the mechanical solutions network 304 provides a computer system that sources projects with various researchers 306(1), 306(2), . . . , 306(J). The researchers 306(1)-(J) receive the terms and eBook passages, and formulate vocabulary questions that test the reader's understanding of the terms, either alone, or in reference to the particular context in the eBook passage. For instance, suppose a researcher 306(1) received the term "fair" and a reference to the work, *Renaissance Day*. After reviewing this passage, the researcher may pen a vocabulary question, as follows:

The term "fair" is used as a noun in which of the following phrases?
A. The ale was a fair price.
B. It was perhaps the most exquisite fair I have ever seen.
C. She was the fairest of them all.
D. None of the above Examples of the mechanical solutions network 304 include Mechanical Turk™ system provided by Amazon, Inc. of Seattle, Wash., and mobile texting services, such as the service provided by ChaCha Search Inc. of Indianapolis, Ind.

The vocabulary service 122 may further leverage other vocabulary support resources 308 to assist in creating vocabulary questions. Such vocabulary support resources 308 may include sites or services that provide such vocabulary support as dictionary services, thesaurus services, spelling services, trivia services, and so forth. In this way, the vocabulary question engine 302 may craft at least part of the question using information retrieved from such third party resources 308. For example, the vocabulary engine 302 may receive a term of interest and utilize a third party resource 308, such as a thesaurus service, to develop confounders to use as false answers in the vocabulary question.

Once generated, the vocabulary service 122 serves the vocabulary questions back over the network 120 to the respective electronic devices 106 that provided the terms originally. The vocabulary service 122 uses the unique ID associated with the terms in the data structure 126 to determine where to return the vocabulary questions. In FIG. 3, the reader 102(1) had requested a dictionary definition of the term "fair." Based on that request, the vocabulary service 122 crafts the question noted above pertaining to the term "fair" and serves that question back to the electronic device 106(1) being used by the reader 102(1). The electronic device 106(1) renders the vocabulary question 310 on the display 110 to test and build the reader's vocabulary. Similarly, the question pertaining to the term "fair" is served back to the electronic device 106(D), which renders the vocabulary question 312 on the display 114 to test the reader 102(N).

Figure 4:
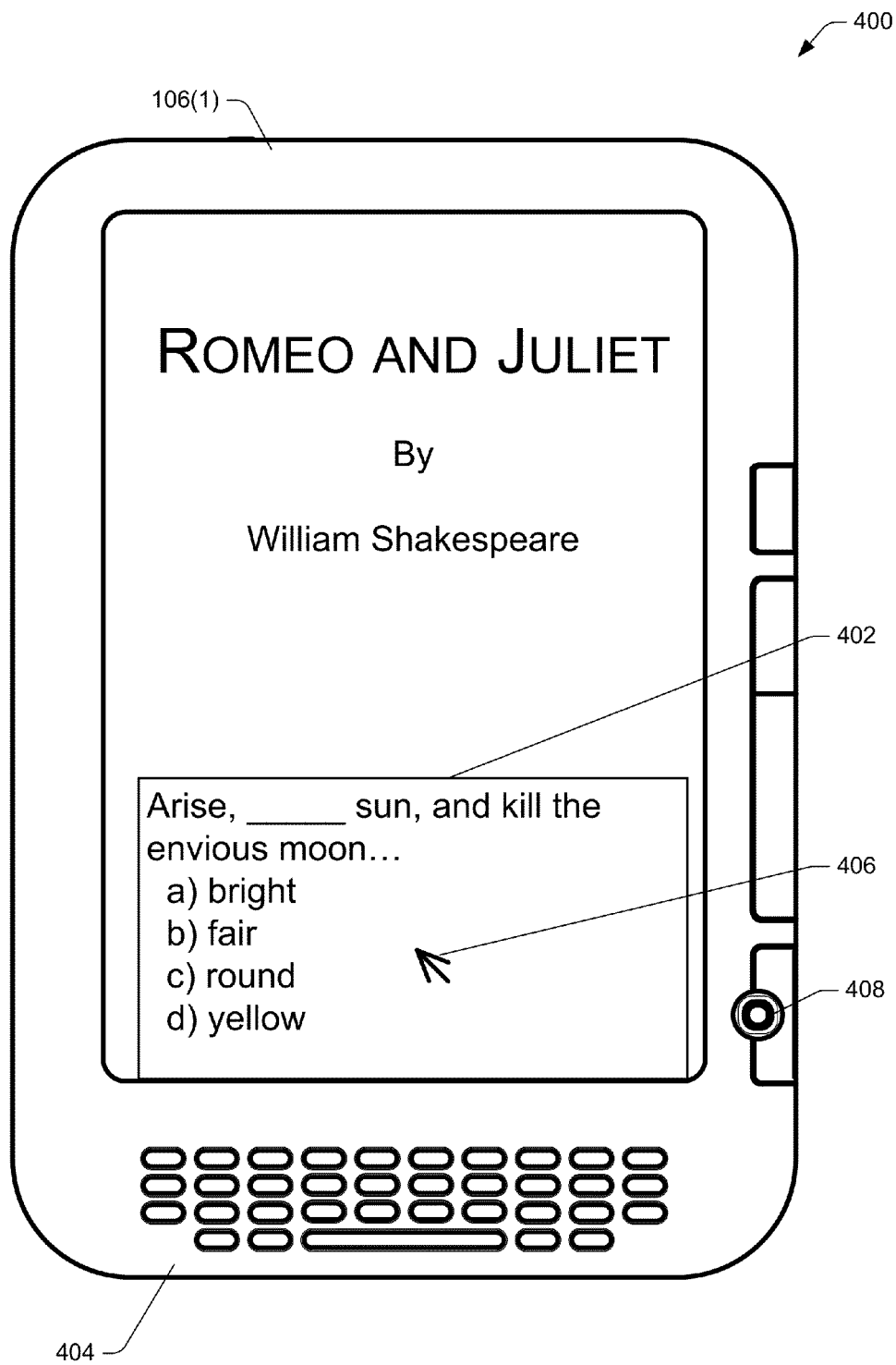
FIG. 4 shows an electronic book reader device with a user interface that presents a vocabulary question for a particular vocabulary term.

FIG. 4 shows the electronic book reader device 106(1) with a question user interface (UI) 400 that presents the vocabulary question 310 to a reader. In this illustration, the question UI 400 includes a question presentation panel 402 that contains the question 310 in written form. The panel 402 may be overlaid on the eBook to which the vocabulary question pertains. As shown here, the panel 402 is overlaid on a cover image of the eBook *Romeo and Juliet*, from which the vocabulary terms are extracted. The reader may enter a response using the keyboard 404 by typing in one of the multiple-choices of A, B, C, or D. Alternatively, the reader may enter an answer by moving a pointer 406 via a navigation mechanism 408 (e.g., thumbwheel, joystick, touchpad, etc.) to select one of the multiple-choice answers. Upon entry of an answer, the user response is processed either internally by the eBook reader device 106(1) or by the vocabulary service 122.

Figure 5:
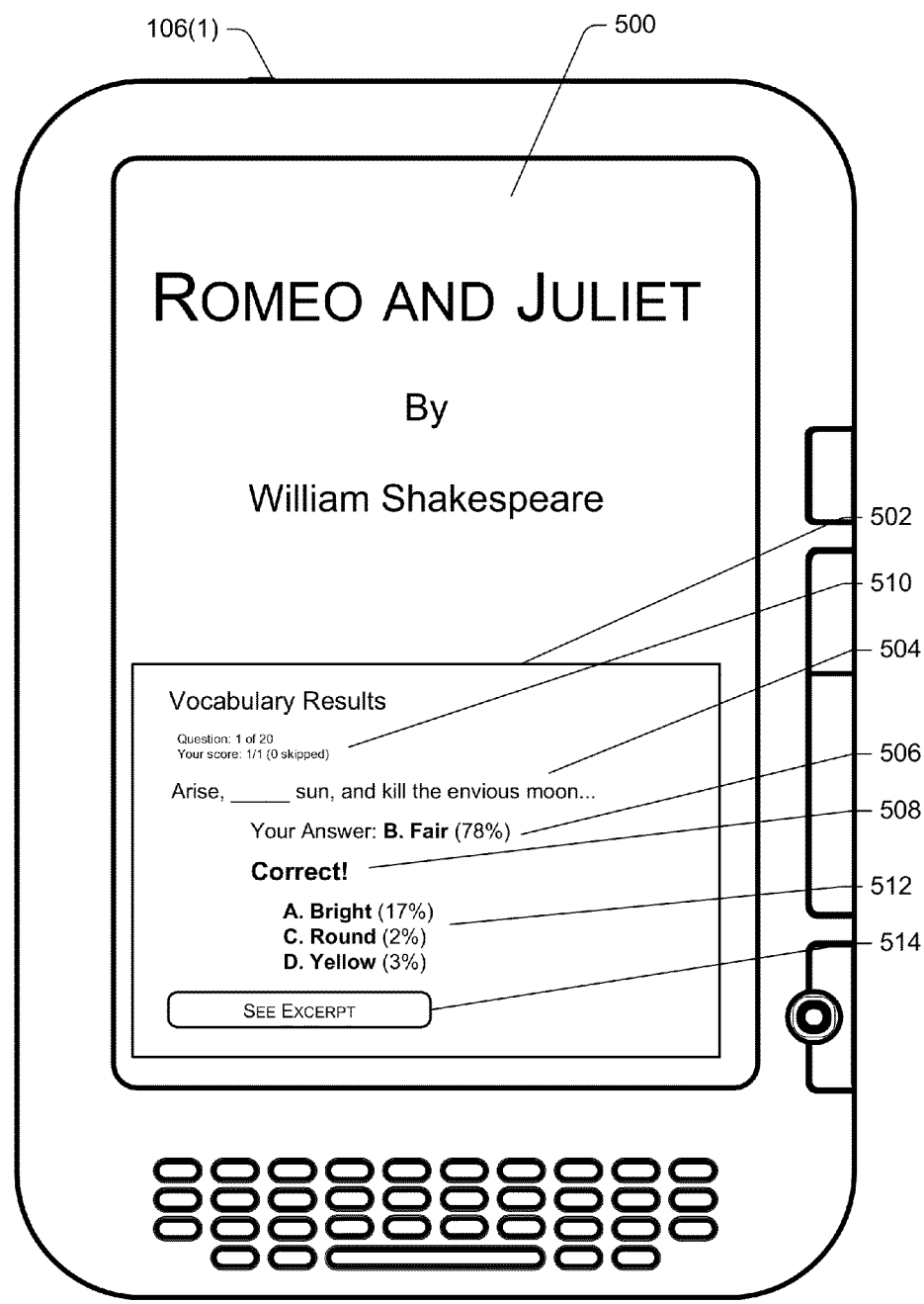
FIG. 5 shows the electronic book reader device with a user interface that presents results to the reader's response to the question in FIG. 4.

FIG. 5 shows the electronic book reader device 106(1) with a vocabulary results UI 500 that is presented in response to the reader entering an answer in the question UI 400 of FIG. 4. The results UI 500 has a panel 502 to present the results of the reader's answer. The panel 502 may optionally restate the vocabulary question 504 and then reveals the reader's answer 506 along with an indication 508 as to whether the reader was correct. In this example, the reader answered "B. Fair" 506, which is noted as being correct 508. The results panel 502 may further show the reader's testing statistics 510.

In one implementation, the vocabulary questions may be submitted to many readers in the reader population 104. The vocabulary service 122 may then track the answers from the members and compute statistics. For instance, suppose many of the readers 102(1)-(N) were given the same question posed in FIG. 4:

Arise, sun, and kill the envious moon . . .
A. bright
B. fair
C. round
D. yellow After some period of time, the vocabulary service 122 finds that 78% of the community answered correctly with choice "B. fair", while the choice "A. bright" placed second with 17% of the responses, the choice "D. yellow" finished third with 3%, and the choice "C. round" finished fourth with 2%. These group statistics may also be presented in the panel 502 so that the reader can compare her results with those of other readers. Moreover, the vocabulary service 122 may operate vocabulary games or other contests that allow readers to compete with one another.

In the results UI 500, the answer 506 may include the percentage of readers who responded with that same answer.

Here, 78% of the reader population answered correctly with choice "B. Fair". The panel 502 may further include a listing 512 of the other choices, along with percentages of responses from the reader population. A "See Excerpt" control 514 may be selected by the reader to show the full excerpt from which the vocabulary term was extracted. The reader may use the keyboard 404, navigation mechanism 308, or other control buttons to select the control 514. Moreover, the display may include a touch responsive screen that allows the user to select the control 414 through touch or proximity to the control 514.

Figure 6:
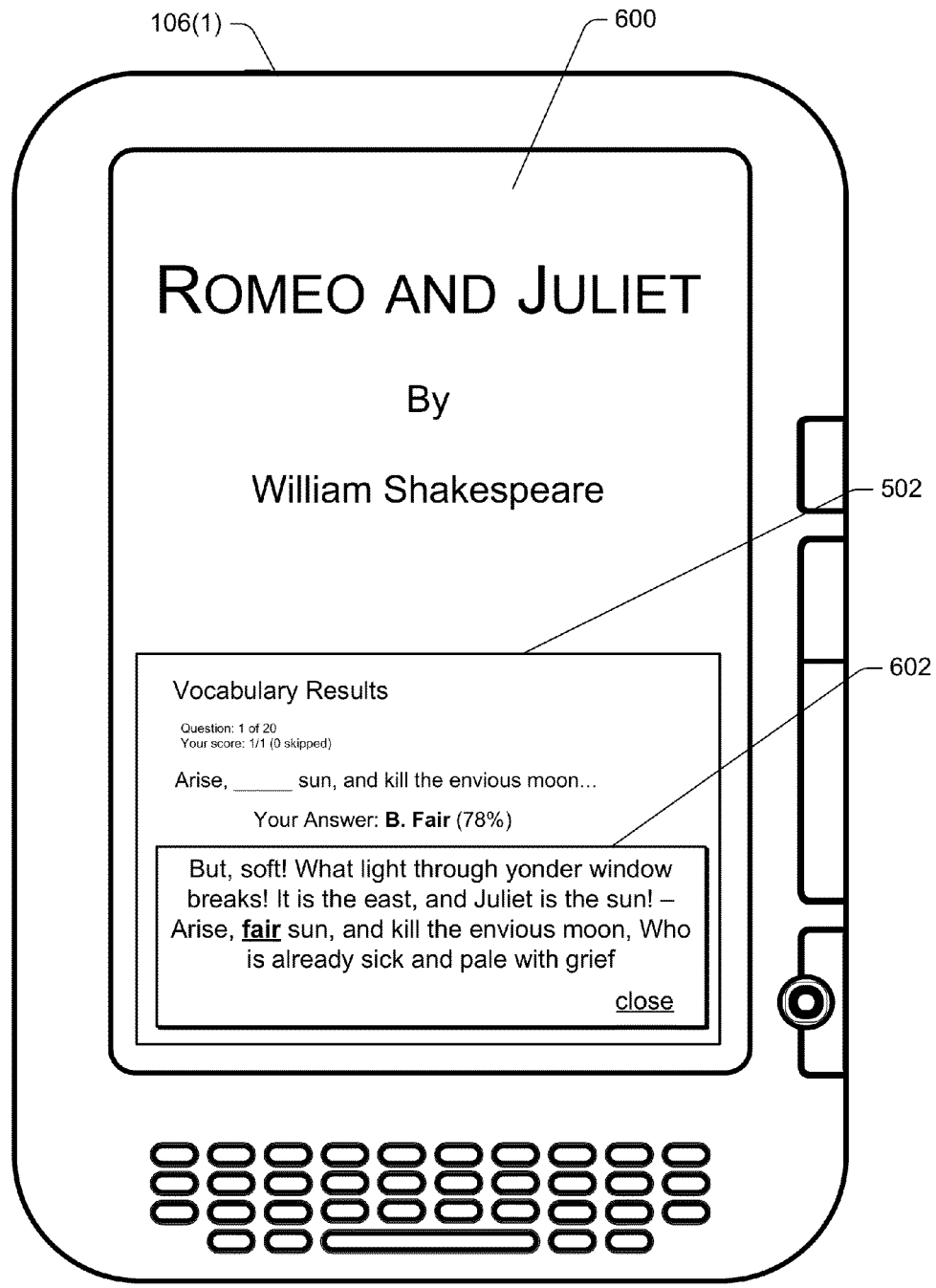
FIG. 6 shows the electronic book reader device with a user interface that reveals the eBook passage from which the particular vocabulary term was extracted.

FIG. 6 shows the vocabulary results UI 500 after the reader actuates the "See Excerpt" control 514. An excerpt box 602 is invoked and positioned over the panel 502 to show the full context of the eBook from which the term being tested was extracted. The term being tested may also be emphasized in some manner, such as by underlining, bolding, highlighting, or some other focus technique.

With reference again to FIG. 3, the vocabulary service 122 may further give the reader 102(1) an opportunity to rate the vocabulary question. In addition, the questions may be rated by other readers from the reader population 104 who are interested in learning the same term. In this manner, the community functions as feedback to validate the effectiveness of the questions, particularly those that were automatically generated. The rating process may take any number of forms, such as from simply asking "Was this vocabulary question helpful?" to ranking various questions that attempt to test the reader's vocabulary of a given term.

Figure 7:
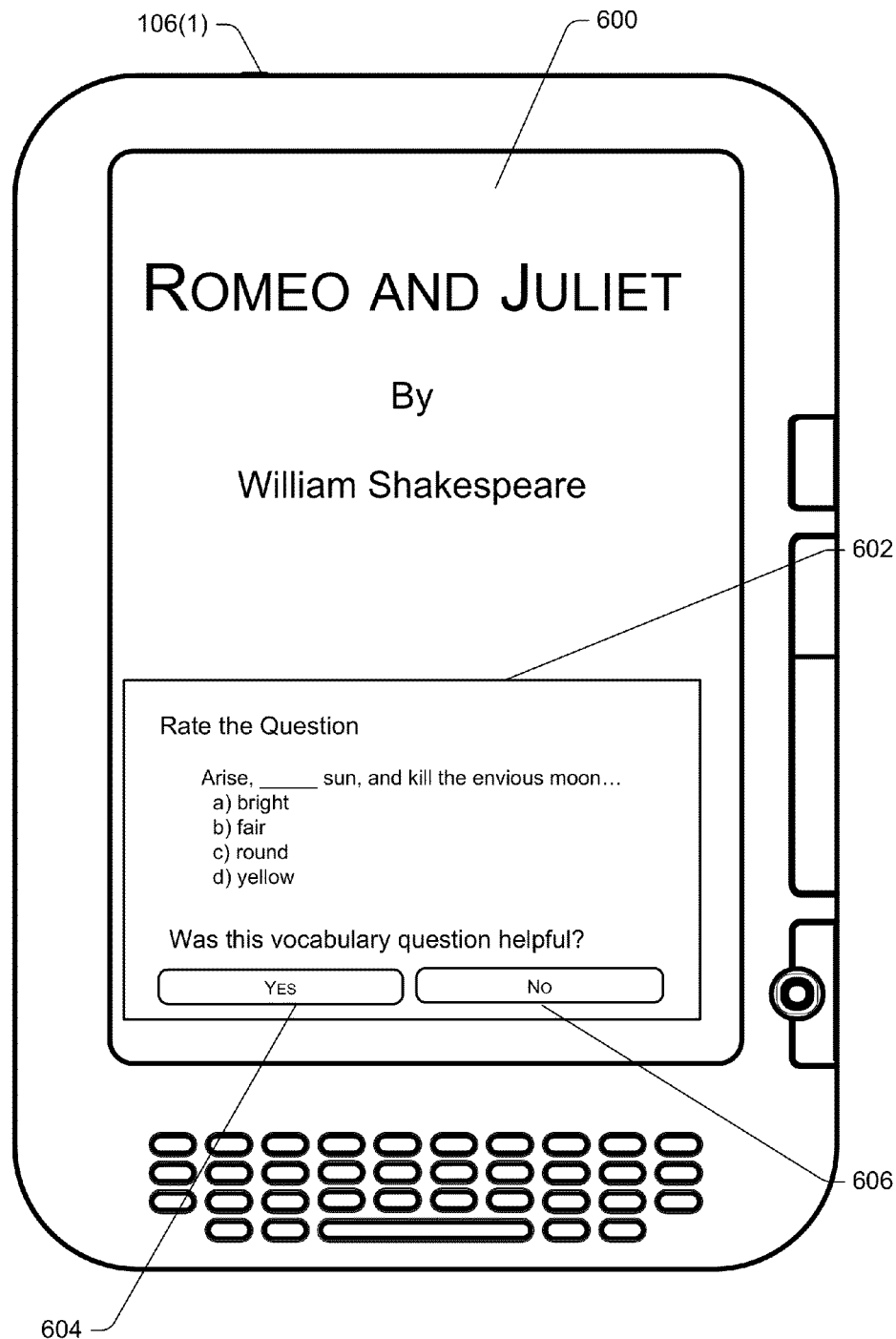
FIG. 7 shows the electronic book reader device with a user interface that allows the reader to rate the vocabulary question in FIG. 4.

FIG. 7 shows the electronic book reader device 106(1) with a rating UI 700 that may be presented to the reader following the question and answer session. The rating UI 700 has a panel 702 configured to seek the reader's feedback on the question. In this illustration, the panel 702 asks the simple question "Was this vocabulary question helpful?" and provides two response controls: a "yes" control 704 and a "no" control 706. The reader may elect one of the controls 704 and 706 and the response is returned to the vocabulary service for processing. The controls may be selected using the keyboard 404, the navigation mechanism 408, other physical control buttons, or soft keys via a touch-responsive screen.

With reference again to FIG. 3, in another implementation, the service 122 may post the vocabulary questions for discussion and debate in an online discussion format. Members of the reader population may review the vocabulary questions and post comments. Other members may then comment on others' postings. The members may discuss whether the questions are appropriate in terms of difficulty or helping build the reader's vocabulary. In an education setting, the community may help sift through questions that would be appropriate for different reading levels, such as grammar school, middle school, or high school.

The vocabulary service 122 (or the device 106 itself) may also track response time that gauges a reader's effectiveness in answering the questions. The response time may be measured as the time duration from presentation of the vocabulary question until the reader enters an answer. This feature may be used, for instance, when administering an exam or when comparing users in a reputation system. These response time metrics may then be tracked and provided as feedback to the user or may contribute to score in a game or be used to affect the user's rating in a reputation system.

In the above discussion, the vocabulary questions and answers have been described as being textual in nature, where questions and possible answers are written and displayed. In some implementations, however, the devices for text-based digital work may include a text-to-speech feature that converts the text into an audible form, whereby the device effectively reads the text to the user. In such situations, the questions and answers may be presented in an audible form as well.

Illustrative Vocabulary Information UIs

Figure 8:
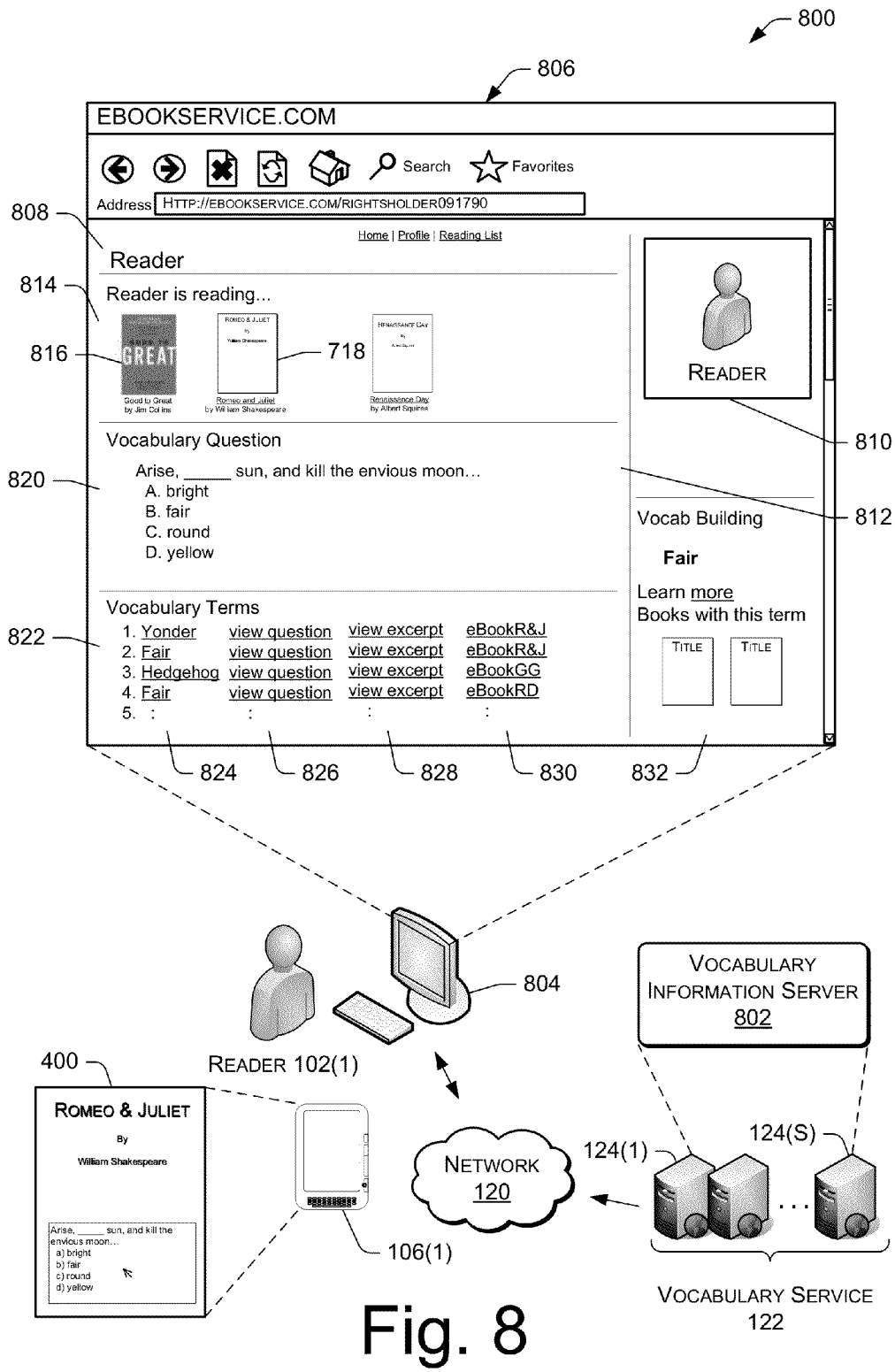
FIGS. 8-11 illustrate an architecture in which the vocabulary service provides more extensive information pertaining to the vocabulary terms that the reader has indicated an interest in learning, as well as terms of interest to the entire population of readers. Each of the figures illustrates a different screen rendering of a user interface for providing the vocabulary information from different perspectives.
Figure 9:
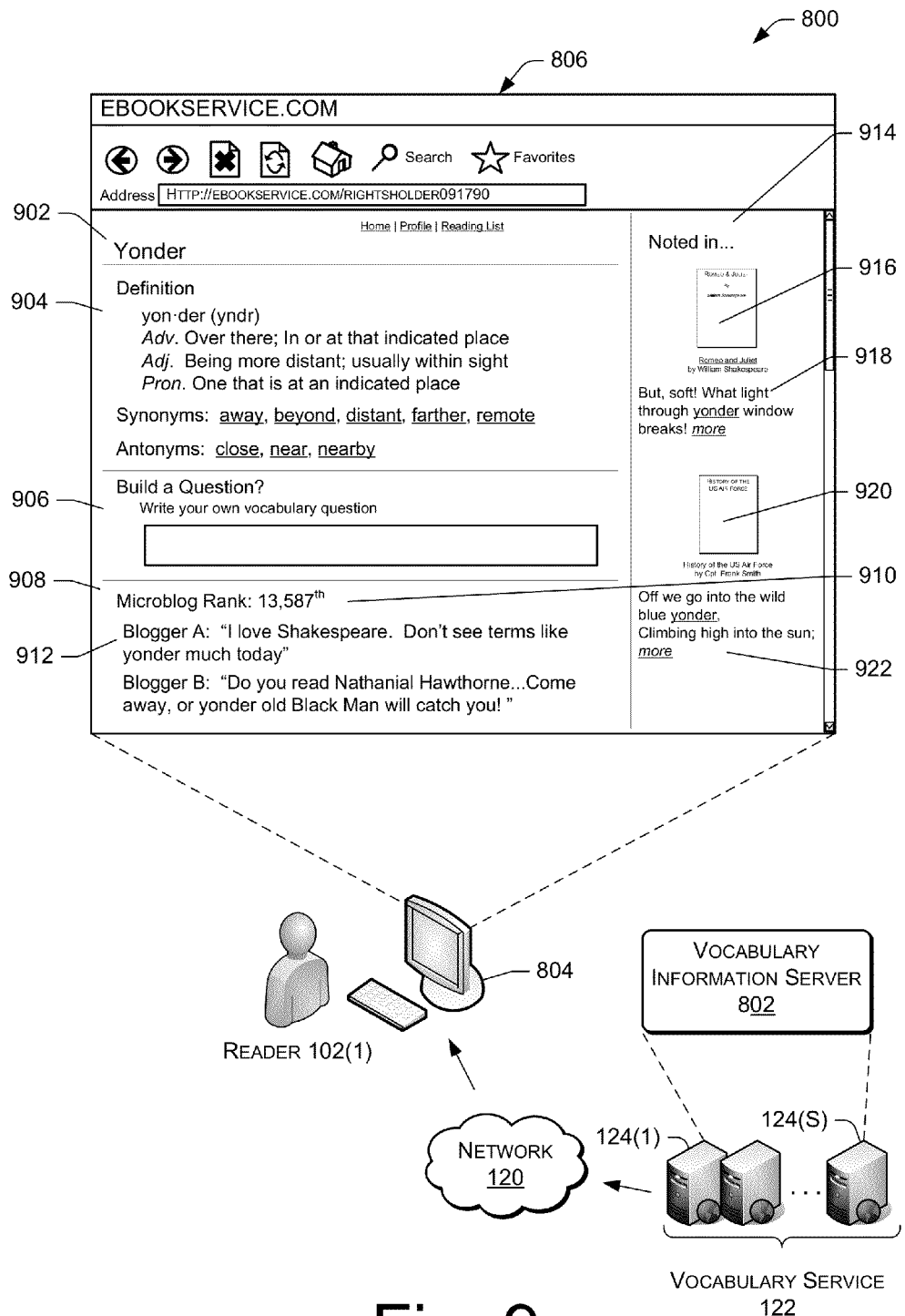
Figure 10:
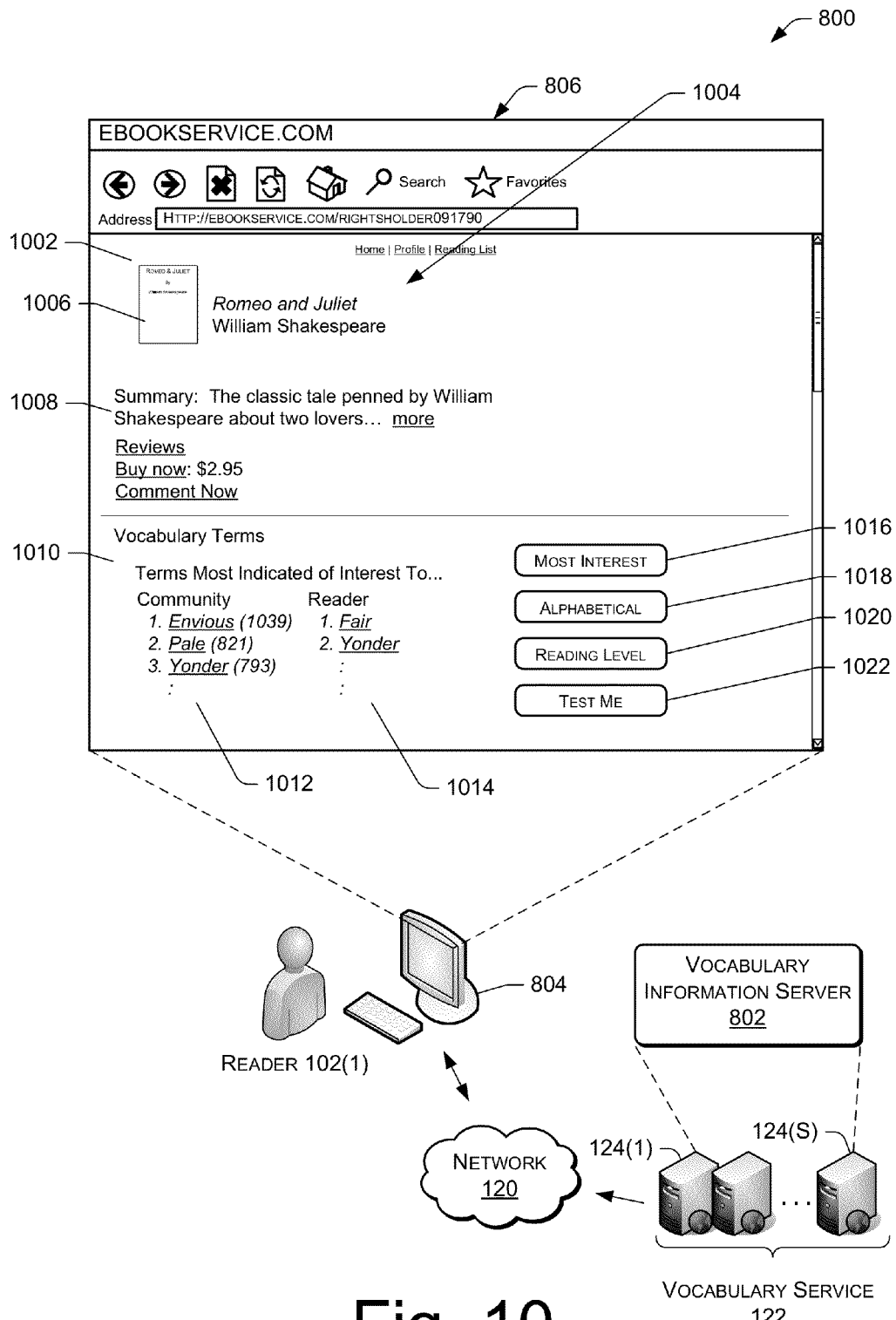

FIGS. 8-10 illustrate an example architecture 800 in which the vocabulary service 122 provides more extensive information pertaining to the vocabulary terms that the reader has indicated an interest in learning, as well as terms of interest to the entire population of readers. As shown in FIG. 8, the vocabulary service 122 includes a vocabulary information server 802 that executes on the servers 124(1)-(S). The vocabulary information server 802 provides information about the vocabulary terms and packages that information in various views or page renderings tailored for various perspectives. For instance, one view of the information may be from a reader's perspective, showing the terms that the reader identified as being of interest (e.g., looked up a definition, annotated the term or phrase, highlighted the term or phrase, etc.) and information about those terms. Another view may be from the term perspective, showing common definitions, sample vocabulary questions, the eBooks from which the terms are extracted, and so forth. Another view may be from the eBook perspective, showing the terms most commonly noted of interest by the reader population. Examples of these perspectives are provided in this FIG. 8 and in later FIGS. 9-10. Many other perspectives are possible.

A representative reader 102(1) from the population 104 (FIG. 1) may access the vocabulary information via a computing device 804 over the network 120. The computer 804 may run a browser that requests and renders web pages from the vocabulary information server 802 to form a vocabulary information user interface (UI) 806. Thus, in the examples illustrated herein, the screen renderings are illustrated as web pages rendered within a browser. However, this is merely one possible implementation, and other technologies may be employed to facilitate a vocabulary information UI. Further, in this example, the computing device 804 is a desktop computer equipped with a browser. However, other devices may be employed by the reader 102(1), such as a laptop computer, PDA, communications device, notepad computer, or essentially any device equipped with a browser or other rendering application to receive and render web pages or other inactive interfaces provided by the vocabulary service 122.

The reader 102(1) is also illustrated with her electronic device 106(1), which is depicted as rendering the vocabulary question UI 400 from FIG. 4. In some implementations, the electronic device 106(1) may be equipped with a browser or other rendering application to receive and render the information pages served by the vocabulary information server 802. In this manner, the reader 102(1) may use a single electronic device 106(1) for multiple purposes, including reading eBooks, receiving and answering vocabulary questions, and accessing the vocabulary information server 702 to learn more information pertaining to the vocabulary terms.

The vocabulary information UI 806 presents vocabulary information from various perspectives, and allows the reader to navigate these perspectives to gain a deeper understanding of the vocabulary terms. FIGS. 8-10 show a series of screen renderings of the vocabulary information UI 806. The screen renderings are illustrated as web pages rendered within a browser. However, as noted above, this is merely one possible implementation and other technologies may be employed to facilitate electronic user entry of questions.

In FIG. 8, a first screen rendering 808 of the vocabulary information UI 806 is a reader's page that provides the reader's perspective of the vocabulary information. That is, the reader's page 808 contains information pertaining to a particular reader, such as the reader 102(1), in regards to the vocabulary terms that the reader has previously noted as being of interest. The reader's page 808 has an identity tile 810 to personalize the page as being associated with the reader 102(1). The identity tile 810 may include an image of the reader (if one exits) and any pertinent information, such as his residence or other address. The reader may provide this personal data as part of a registration process and that information is associated with the particular reader at the vocabulary service 122.

The reader's page 808 includes a primary area 812 to the left of the identity tile 810. The primary area 782 is separated into three demarcated zones. A first or top zone 814 allows the reader 102(1) to indicate which eBooks she is currently reading, such as Good to Great by Jim Collins as represented by a thumbnail 816 and Romeo and Juliet by William Shakespeare as represented by a thumbnail 818. A second or middle zone 820 may be used to present vocabulary questions to the reader based on terms the reader has shown an interest. Here, a vocabulary question from the eBook *Romeo and Juliet* is shown. The questions may be randomly selected for the reader based on terms collected over time or be specific to the eBooks that the reader lists in the first zone 714. Moreover, the questions may be repeated until the reader shows an improved accuracy.

A third or lower zone 822 identifies vocabulary terms relevant to the reader. In this example, the most recent vocabulary terms 824 taken from the current eBooks are listed, including the terms "yonder" and "fair" from the eBook *Romeo and Juliet* and the term "hedgehog" from the eBook *Good to Great*. Each term in the list 824 is a link to another view of the vocabulary information from the term's perspective. Several vocabulary-building options may also be provided for selection by the reader to seek more information about the terms. For example, a "view question" control 826 allows the reader to see one or more questions pertaining to that term. The questions may be presented in the middle zone 814. A "view excerpt" control 828 allows the reader to see the excerpt from the eBook in which the reader first noted the term (e.g., sought a definition, highlighted it, etc.). An "eBook" control 830 may also be provided to navigate to the eBook from which the vocabulary term was extracted. These are just example controls, and others are possible, such as a link to a dictionary definition, or a link to a thesaurus.

It is noted that the primary area 812 may be segmented into more or less than three zones. Further, the zones may be of any shape. Moreover, the content of each zone is merely representative. In other implementations, the zones may include any number of things, such as eBooks that the reader intends to purchase or read next, discussion boards for the reader population, and so forth.

Also shown on the reader page 808 is a recommendation region 832 beneath the identity tile 810. In the recommendation region 832, recommendations may be made to the reader to learn more about a particular term. For instance, suppose the reader has struggled with the term "yonder", since it is listed as the number one vocabulary term in zone 822. The recommendation region 832 may provide suggestions about where to learn more about the term "yonder," or other books in which the term appears frequently.

FIG. 9 shows a second screen rendering 902 of the vocabulary information UI 806 that is presented in response to the reader activating the term control 824 for the term "yonder" (FIG. 8). The screen rendering 902 is a term page that provides a view of the vocabulary information from the term's perspective. In this example, the term page 902 is for the particular vocabulary term "yonder" as noted by the heading at the top of the page. The term page 902 has a details area 804 that contains details about the term. Here, the details area 804 includes a definition of the term "yonder", along with synonyms and antonyms. Each entry in the synonyms and antonyms may also be formatted as an actuatable link that navigates to other term pages for these specific terms. The term page 802 further has a question entry area 806 which allows the reader to enter a question that can be used to test and build the reader's vocabulary. The reader may enter the question into the box in area 806 and the question is saved in association with the reader's identity and the term of interest (i.e., "yonder" in this example). In this way, the reader can tailor questions suitable for his or her learning style to improve comprehension of terms.

The term page 902 also has relevance area 908 that explores current uses of the term of interest as gathered from various sources. For instance, the relevance area 908 may show a ranking 910 of the term "yonder" within a social networking service or a microblog service (e.g., "Twitter.com", which is owned and operated by Twitter, Inc. of San Francisco, Calif.). The area 908 may also show actual microblog entries 912 that contain the term "yonder", such as the entries from bloggers A and B. In this example, Blogger A writes, "I love Shakespeare. Don't see terms like yonder much today." Blogger B subsequently posts "Do you read Nathanial Hawthorne . . . Come away, or yonder old Black Man will catch you!" This is an excerpt from Hawthorne's work, *The Scarlet Letter*, in which the full excerpt is as follows:

Come away, mother! Come away, or yonder old Black Man will catch you! He hath got hold of the minister already. Come away, mother, or he will catch you! But he cannot catch little Pearl!

Alternatively, the relevance area 908 may include how the term is being used as a tag to identify other books or items, or instances where the term is being used in reviews. There are many diverse sources of information from which to collect and aggregate information about the term, which in turn may assist the user in learning more about the term of interest.

The term page 902 further includes a reference area 914 arranged as a vertical column that indicates sources from which readers have noted an interest in the term. Two eBooks are illustrated for example purposes to demonstrate possible sources for the term "yonder," although there may be many other references. The first source presented in the reference area 914 is the eBook *Romeo and Juliet*, as indicated by the thumbnail image 916, along with an excerpt 818 from the eBook that contains the term "yonder." The second source shown in the reference area 914 is the eBook *History of the US Air Force*, as indicated by the thumbnail image 920, along with an excerpt 922 from the eBook that contains the term "yonder." The images 916 and 920 are also fully actuatable and associated with respective eBook pages, such that upon selection by the reader, the browser navigates to a page for that particular eBook.

FIG. 10 shows a third screen rendering 1002 of the vocabulary information UI 806 that is presented in response to the reader activating the eBook image 916 for the eBook *Romeo and Juliet* (FIG. 9). The third screen rendering 1002 is an eBook page that provides a view of the vocabulary information from the eBook's perspective. The eBook page 1002 includes a header region 1004 to identify the eBook. A thumbnail image 1006 of the eBook cover may be included in this region 1004. The eBook page 1002 further includes a details area 1008 with details about the book, such as a description, reviews, and so forth. The details area 1008 may further include a "Buy Now" control to facilitate purchase of the book, as well as a "Comment Now" control to enter comments about the book.

Also provided on the eBook page 1002 is a vocabulary terms area 1010 that contains one or more listings of vocabulary terms from the eBook that were identified by readers over time. The listing may be organized in many different ways. In this illustration, the terms most often noted to be of interest from the eBook *Romeo and Juliet* are shown in two separate and numerated lists: a first list 1012 providing the terms of interest to the community of readers and a second list 1014 providing the terms of interest to the particular reader. In the first list 1012, a count of the number of readers who looked up the term or otherwise indicated an interest is indicated in parentheses following the term (e.g., 1039 people cited an interest in the term "envious"). This arrangement may be a default, or be invoked through selection of the "most interest" control 1016. Notice that each term in the lists 1012 and 1014 are links that take the user to the corresponding term page, such as the term page 902 for "yonder" shown in FIG. 9.

The vocabulary terms may be ordered in other arrangements through selection of other various controls. For example, an alphabetical control 1018 arranges the vocabulary terms from the particular eBook in alphabetical order and a reading level control 1020 ranks the terms of interest according to a reading metric. Other arrangements may be according to most looked up terms, most quoted terms, most highlighted terms, most annotated terms, most recent terms indicated as being of interest, and so forth. Moreover, the terms may be arranged according to external indicia, such as the terms that most frequently appear in a crossterm puzzle of a particular source (e.g., New York Times crossterm puzzles), or the terms that are rising fast in rankings on a social network or blogging service.

The vocabulary terms area 1010 may further include a "test me" control 1022 that provides a series of vocabulary questions to test the reader's comprehension of the terms in the particular eBook.

Figure 11:
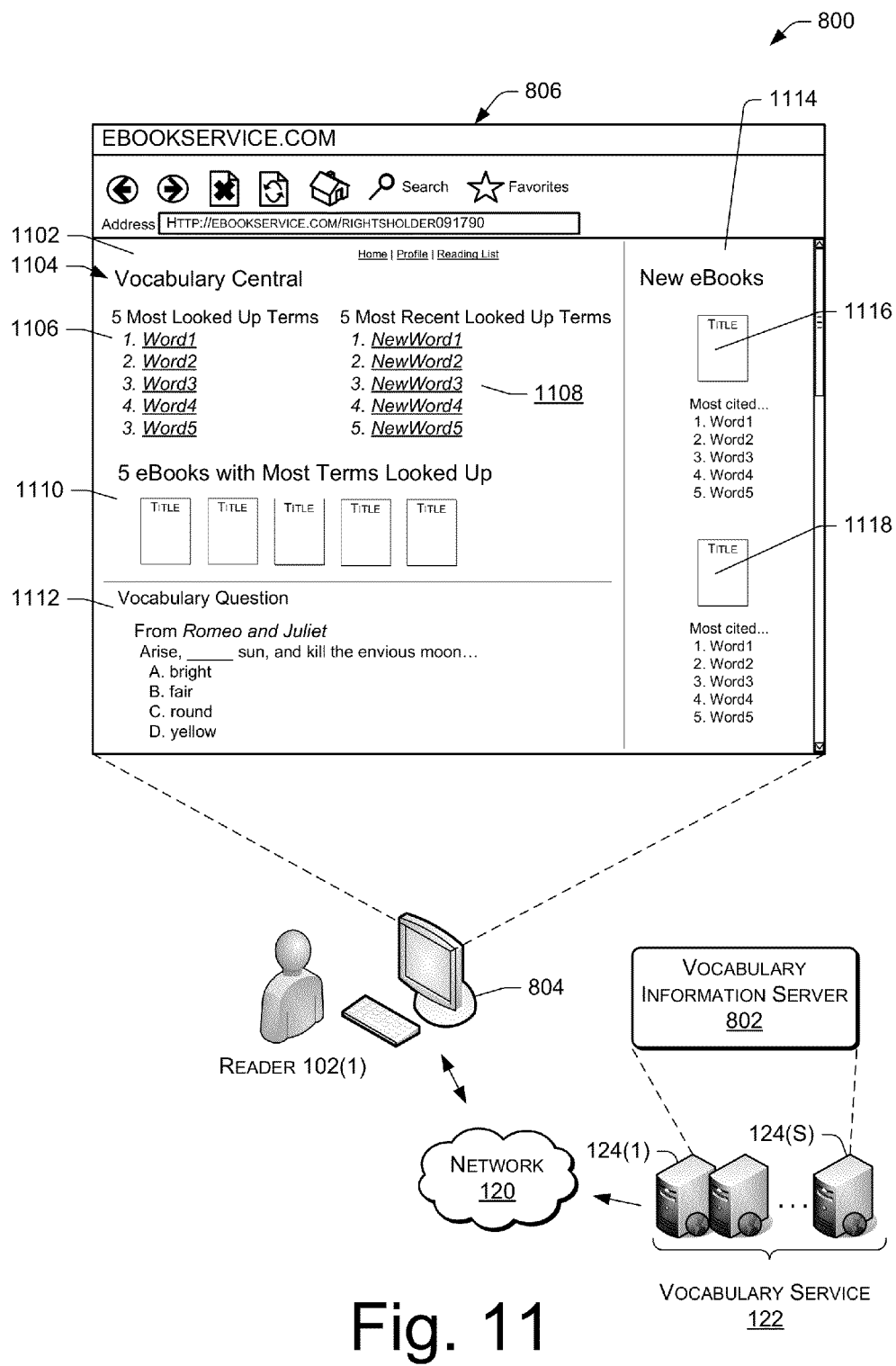

FIG. 11 shows a fourth screen rendering 1102 of the vocabulary information UI 806 that presents a general vocabulary page which is not specific to a term, or reader, or eBook. Rather, the vocabulary page 1102 simply pertains to vocabulary. The vocabulary page 1102 is identified as such by the heading 1104, such as "vocabulary central." The vocabulary page 1102 presents information from a vocabulary building perspective. The page may be structured in any number of ways, with many various graphical layouts. In this example, the page 1102 includes lists of popular vocabulary terms, such as a list 1106 of the five most looked up terms or a list 1108 of the five most recently looked up terms. A list 1110 of the five eBooks with the most looked up terms may also be provided on the page 1102.

The vocabulary page 1102 may further include a question region 1112 to present random vocabulary questions that have been crafted over time. A different vocabulary question may be presented with each reloading of the page.

The vocabulary page 1102 may also have a new eBooks area 1114 that presents the latest or most popular new eBooks. The eBooks may be identified through representative thumbnail images, such as images 1116 and 1118, along with a corresponding list of terms most often referenced in the new eBooks.

Enhanced Definitions and Samples

Figure 12:
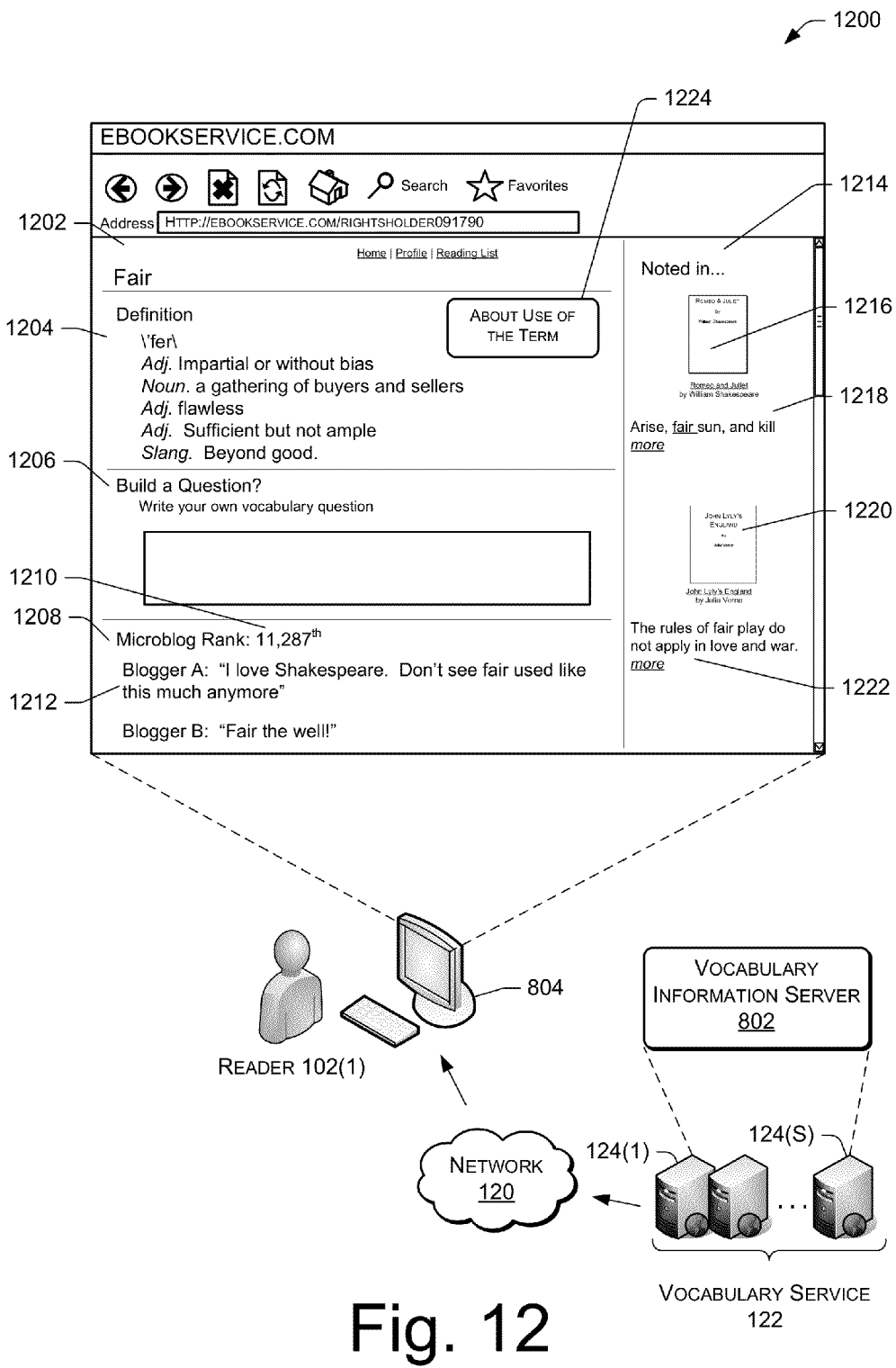
FIG. 12 illustrates an architecture in which the vocabulary service provides definitions and information about a term.

FIG. 12 shows an enhanced definition UI 1200 that is presented in response to a user query about the definition of a particular term. A screen rendering 1202 depicts a term page that provides a view of the term and detailed information about the term and various meanings associated with it. In this example, the term page 1202 is for the vocabulary term "fair" as noted by the heading at the top of the page. The term page 1202 has a details area 1204 that contains details about the term. Here, the details area 1204 includes definitions of the term "fair." In some implementations, other information such as synonyms and antonyms may also be presented. The synonyms and antonyms entries may also be formatted as actuatable links that navigate to other term pages for the specific terms. The term page 1202 further has a question entry area 1206 which allows the reader to enter a question. The reader may enter the question into the box in area 1206 and the question is saved in association with the reader's identity and the term of interest (i.e., "fair" in this example). In this way, the reader can tailor questions suitable for his or her learning style to improve comprehension of terms.

The term page 1202 also has relevance area 1208 that explores current uses of the term of interest as gathered from various sources. For instance, the relevance area 1208 may show a ranking 1210 of the term "fair" within a social networking service or a microblog service (e.g., "Twitter.com", which is owned and operated by Twitter, Inc. of San Francisco, Calif.). The area 1208 may also show actual microblog entries 1212 that contain the term "fair," such as the entries from bloggers A and B. In this example, Blogger A writes, "I love Shakespeare. Don't see fair used like this much anymore." Blogger B subsequently posts "Fair the well!"

Alternatively, the relevance area 1208 may include how the term is being used as a tag to identify other books or items, or instances where the term is being used in reviews. There are many diverse sources of information from which to collect and aggregate information about the term, which in turn may assist the user in learning more about the term of interest.

The term page 1202 further includes a reference area 1214 arranged as a vertical column that indicates sources from which readers have noted an interest in the term. Two eBooks are illustrated for example purposes to demonstrate possible sources for the term "fair," although there may be many other references. The first source presented in the reference area 1214 is the eBook Romeo and Juliet, as indicated by the thumbnail image 1216, along with an excerpt 1218 from the eBook that contains the term "fair." The second source shown in the reference area 1214 is the eBook *John Lyly's England*, as indicated by the thumbnail image 1220, along with an excerpt 1222 from the eBook that contains the term "fair." The images 1216 and 1220 are also fully actuatable and associated with respective eBook pages, such that upon selection by the reader, the browser navigates to a page for that particular eBook.

A user actuable control may also be presented to provide more information about the use of the term 1224. Information about the use of the term, including statistical data is described next with regards to FIG. 13.

Figure 13:
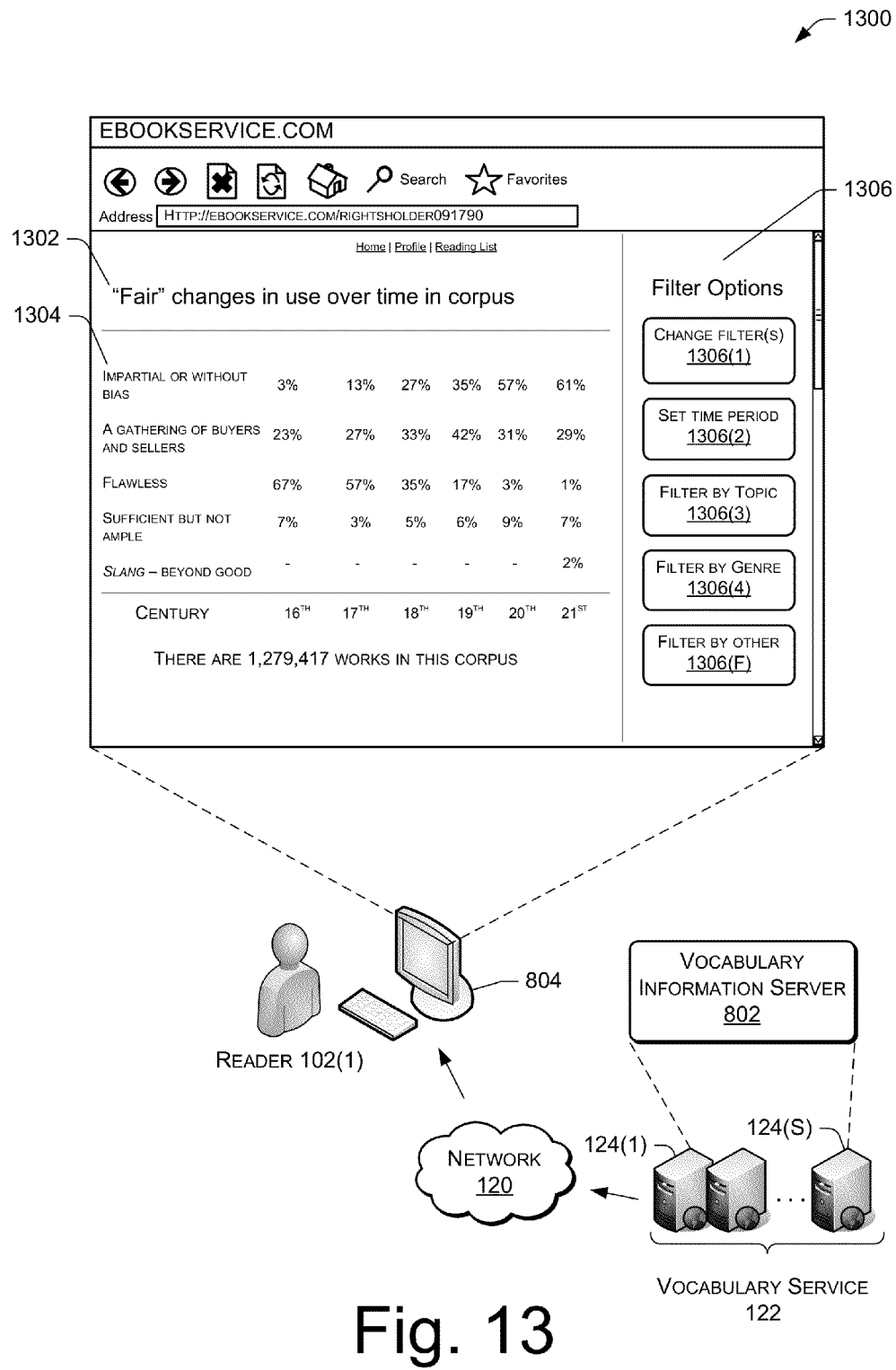
FIG. 13 illustrates an architecture for analyzing the changes of a term over time based upon data in a corpus of content items.

FIG. 13 illustrates an architecture 1300 for analyzing the changes of a term over time based upon data in a corpus of content items by the vocabulary information server 802. The screen rendering 1302 is a trend page that provides a view of the term and the changes in meaning over time as determined from analysis of content items within the corpus. In this example, the trend page 1302 is for the term "fair" as noted by the heading at the top of the page. The trend page 1302 has a details area 1304 that contains a table describing changes in the definition of the term "fair" by century.

As shown in this table, the predominate use of the term "fair" has shifted from being predominately "flawless" in the 16th century to predominately "impartial" in the 21st century. The trend page 1302 thus provides an opportunity to see how the use of a term has evolved over time, and improve comprehension by the user.

In some implementations, this information may also allow a user to anticipate a new usage of a term. Such information may be useful in the formation of marketing programs to either target an advertising message with terms having a new and upcoming meaning, or to avoid an inadvertent association. For example, as shown here, given that the term "fair" has begun to be used to mean "beyond good" in the 21st century, an advertising campaign may be crafted to use this new meaning.

A filter option area 1306 arranged as a vertical column presents several user actuable controls which may be used to alter the presentation of the data on the trend page 1302. A change filter(s) command 1306(1) allows the user to alter existing filters which are applied. A command to set a time period 1306(2) provides a mechanism for the user to change the time period of the trend. For example, the user may wish to set the time period to the past 12 months, rather than the past six centuries, as shown here.

The filter options 1306 may also include a filter by topic 1306(3). For example, a filter may be applied showing the use of the trends for a term within the topic of "jurisprudence." A filter by genre 1306(4) allows for selection of trend information by genre such as mystery, science-fiction, and so forth. Additionally, the user may filter by other factors 1306(F). These factors may include metadata such as described above with respect to FIG. 2. For example, the user may choose to filter to see trend information from books read by readers between the ages of 18 and 25.

Figure 14:
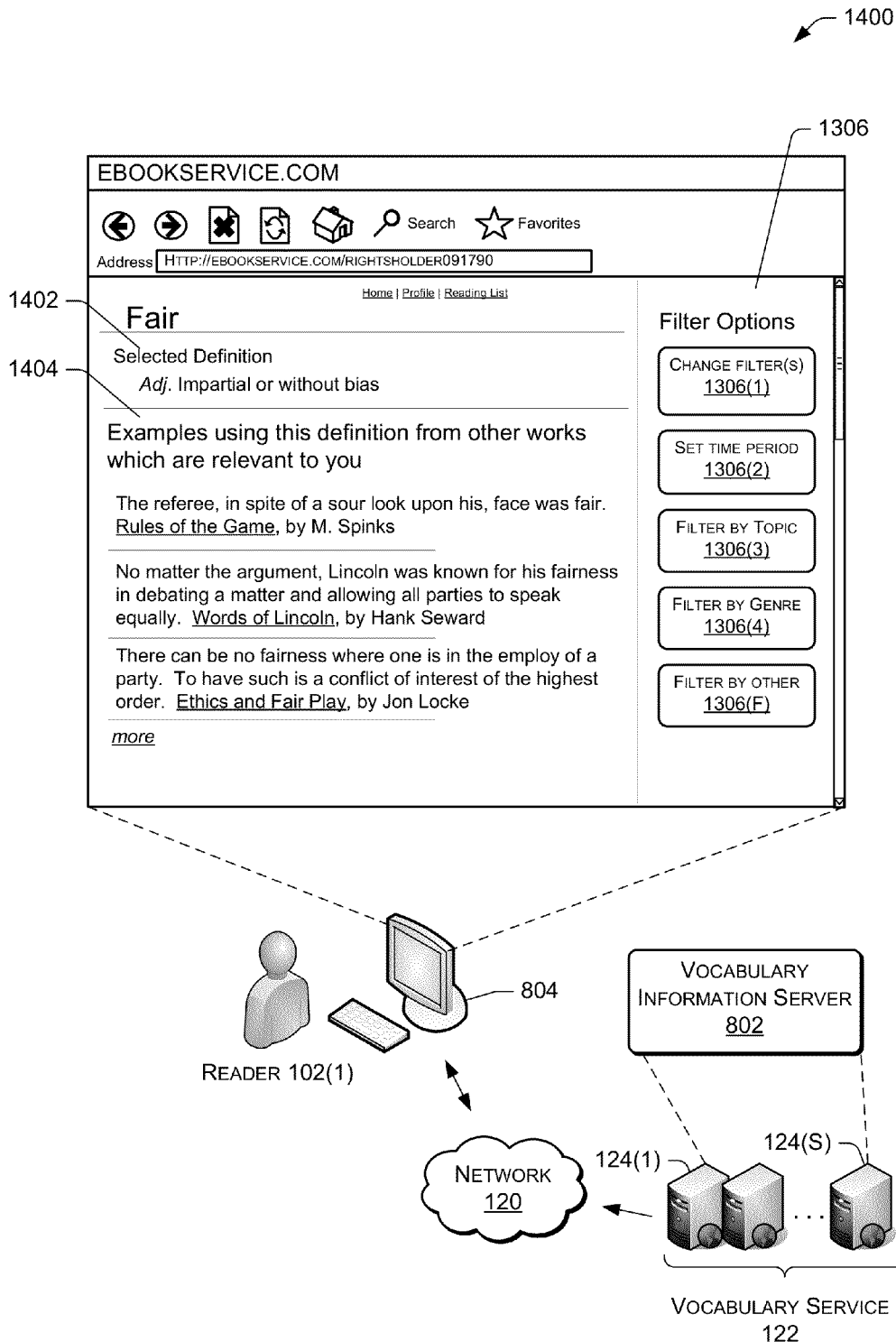
FIG. 14 illustrates an architecture for providing examples of a selected vocabulary term, the examples having been drawn from the corpus of content items.

FIG. 14 illustrates an architecture 1400 for providing examples of a selected vocabulary term, the examples having been drawn from the corpus of content items by the vocabulary information server 802.

The screen rendering 1402 is an example page that provides a view of the term, a selected definition, and examples of the term in use from actual passages. In this example, the example page 1402 is for the term "fair" as noted by the heading at the top of the page. The example page 1402 has a details area 1404 that contains examples of the term which have been excerpted from books which are relevant to the user.

As shown here, the examples include three books, showing passages from sports, history, and ethics. Thus, the user is able in example page 1402 to see the term in action for a selected definition. Should a user become interested in a particular book for which an excerpt has been provided, the user may select a user actuable control and explore that book in more detail, or take other actions such as purchasing the work and so forth.

A filter option area 1306 arranged as a vertical column presents several user actuable controls which may be used to alter the presentation of the data on the example page 1402. As described above, these controls may include the functions such as the change filter(s) 1306(1), the set a time period 1306(2), the filter by topic 1306(3), the filter by genre 1306(4), or other factors 1306(F). These factors may include metadata such as described above with respect to FIG. 2. For example, the user may choose to see examples of the term "fair" as used in non-fiction books identified with the topic "jurisprudence" and published in the past five years.

Figure 15:
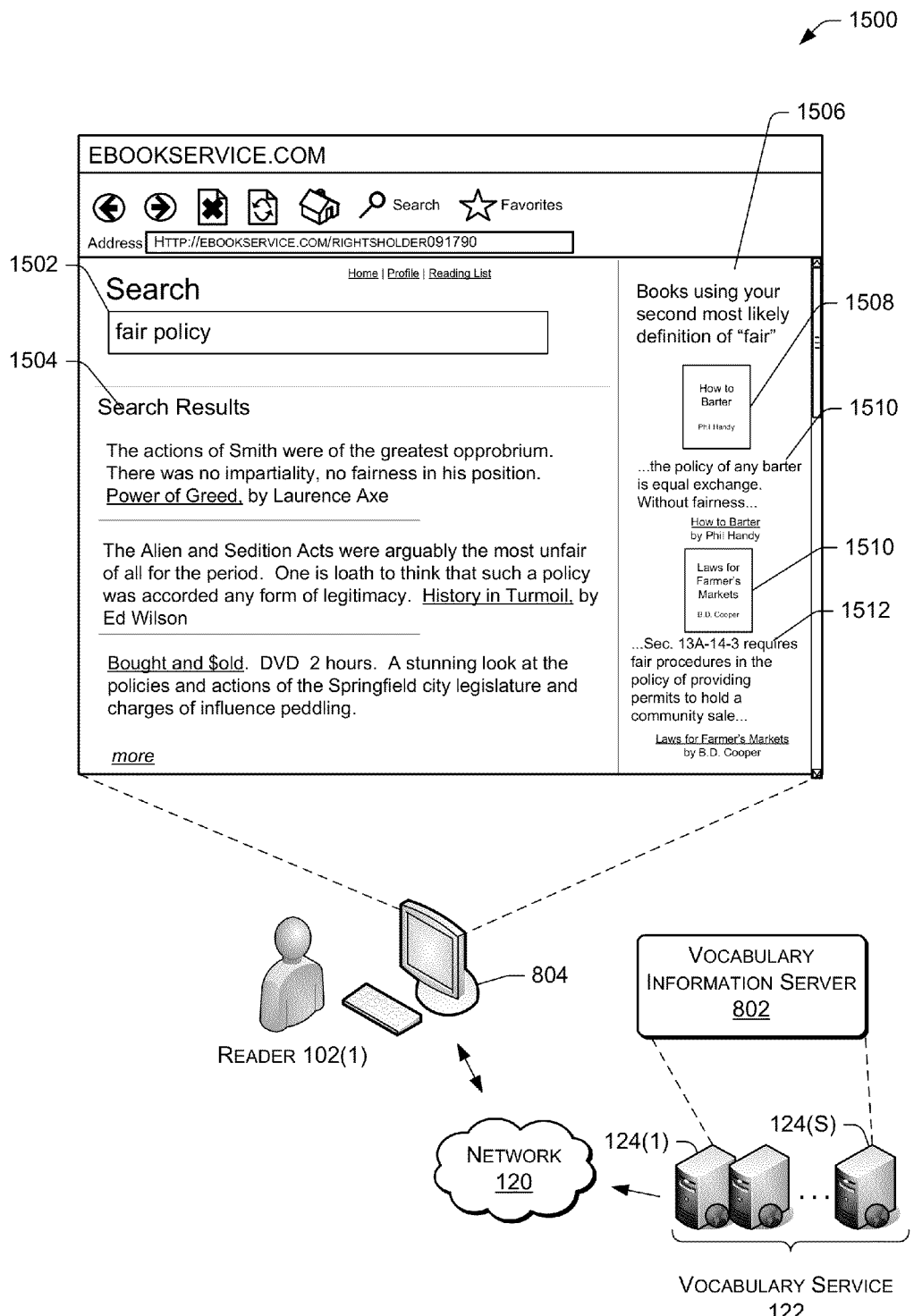
FIG. 15 illustrates an architecture for enhancing a search by using a determined meaning of the search term.

FIG. 15 illustrates an architecture 1500 for enhancing a search by using a determined meaning of the search term as provided by the vocabulary information server 802. The screen rendering 1502 is a search page in which the user has initiated a search for the phrase "fair policy" and received search results in a details area 1504.

As shown here, the search results in the details area 1504 include two books and one video documentary. Based upon the search term of "fair" in combination with the term "policy," the vocabulary information server 802 determined the intended meaning of the term "fair" in this context as being "impartial." Thus, the search results show books using the term with the same meaning.

The search page 1502 further includes a reference area 1506 arranged as a vertical column that indicates books which use the second most likely definition of the term "fair," that of "a gathering of buyers and sellers." Two eBooks are illustrated for example purposes to demonstrate possible books which use the term "fair" in this alternative definition, although there may be many other references. The first source presented in the reference area 1506 is the eBook *How to Barter*, as indicated by the thumbnail image 1508, along with an excerpt 1510 from the eBook that contains the term "fair" with this alternate meaning and the term "policy." The second source shown in the reference area 1506 is the eBook *Laws for Farmer's Markets*, as indicated by the thumbnail image 1510, along with an excerpt 1512 from the eBook that contains the term "fair" also with the alternate definition and the term "policy." The images 1508 and 1510 are also fully actuatable and associated with respective eBook pages, such that upon selection by the reader, the browser navigates to a page for that particular eBook.

Server-Based Vocabulary Game

Figure 16:
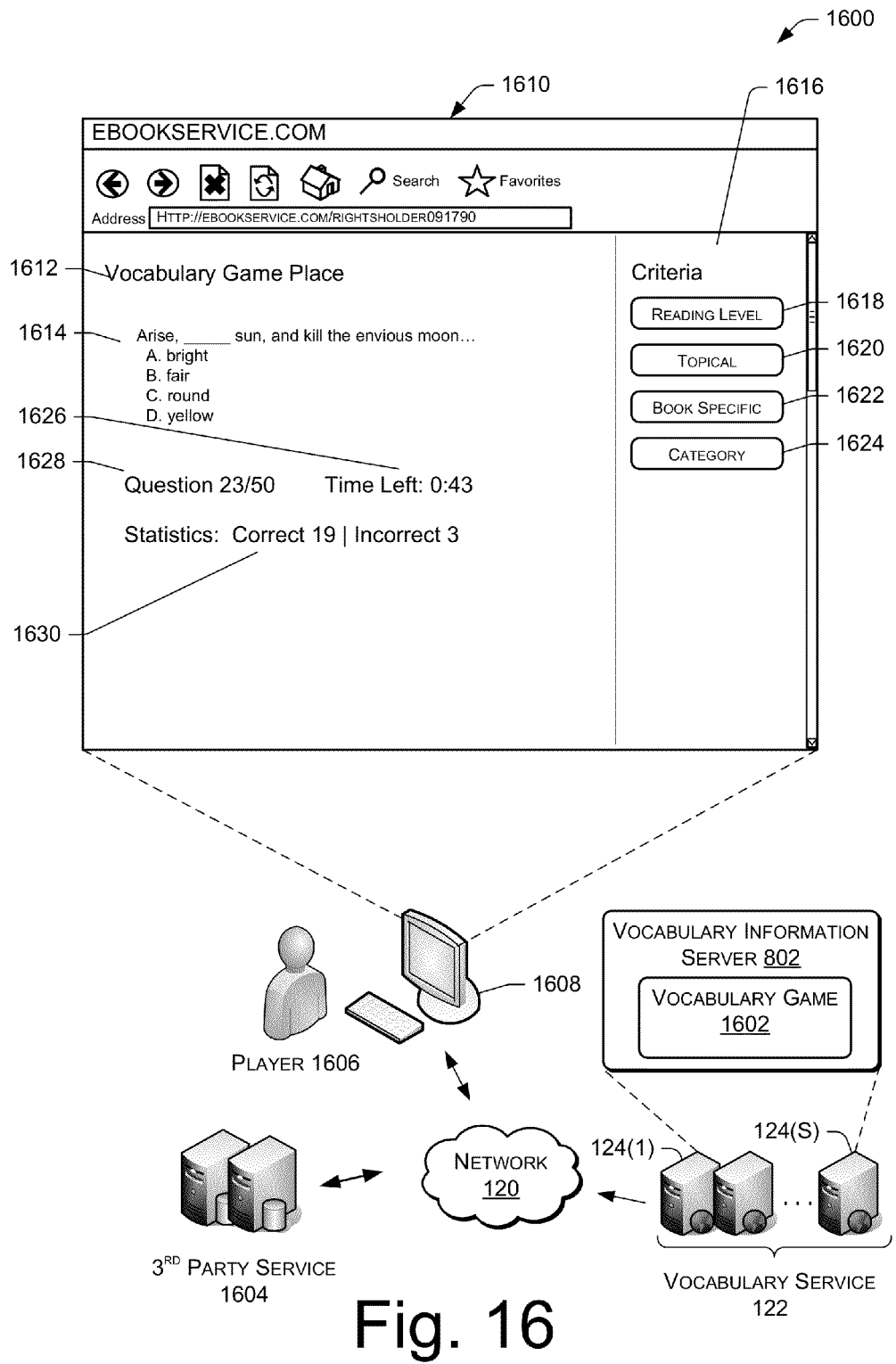
FIGS. 16-17 illustrate an architecture in which the vocabulary service supports a network-based vocabulary game including a confounder game.

FIG. 16 illustrates an example architecture 1600 in which the vocabulary service 122 further supports a network-based vocabulary game 1602. The vocabulary game 1602 is shown as being part of the service offerings of the vocabulary information server 802, although the game 1602 may be operated entirely separate from the server 802. Moreover, the vocabulary game 1602 may be configured to supply the game to third party services 1604. For instance, suppose that the third party service 1604 provides vocabulary support services, such as dictionary or thesaurus resources. A game player 1606 may have an account with the third party service 1604, which permits access to more resources. Among these additional resources may be the vocabulary game that permits the player to build her vocabulary through interactive games.

The player 1606 accesses the network-based vocabulary game 1602 via a computer 1608. In some implementations, the game is delivered over the Internet according to web-based protocols, such as HTTP. The computer 1608 executes a browser (or other rendering application) to request and receive pages, which are rendered to provide a game UI 1610. In other implementations, the game maybe delivered over other types of networks using the same or different protocols.

The game UI 1610 includes a title 1612 (e.g., "Vocabulary Game Place") and question region 1614 to present vocabulary questions. The types of questions may be based on a set of user-selected criteria shown in vertical region 1616. Example criteria might include, for example, terms of a particular reading level as indicated by the "reading level" control 1618, terms of particular topics as indicated by the "topical" control 1620, terms from a specific book as indicated by the "book specific" control 1622, and terms of a particular genre or category as indicated by the "category" control 1624.

Once the gamer player selects the types of questions, vocabulary questions are presented in the region 1614. Suppose, for example, the user selected the "book specific" criteria 1622 and particularly books by Shakespeare. A series of vocabulary questions involving terms extracted from various Shakespeare works would be serially depicted in the region 1614.

The first question is presented when the player 1606 starts the game. A timer 1626 is initiated to provide a countdown of the time remaining. As the player responds to each question, a next question is presented and a question count 1628 is maintained to let the player understand how many questions are left in the allotted time 1626. A tally 1630 of correct and incorrect answers is also updated on the fly as the player 1606 plays the game.

The layout of the game UI 1610 is but one example. Many other layouts and designs are possible.

Figure 17:
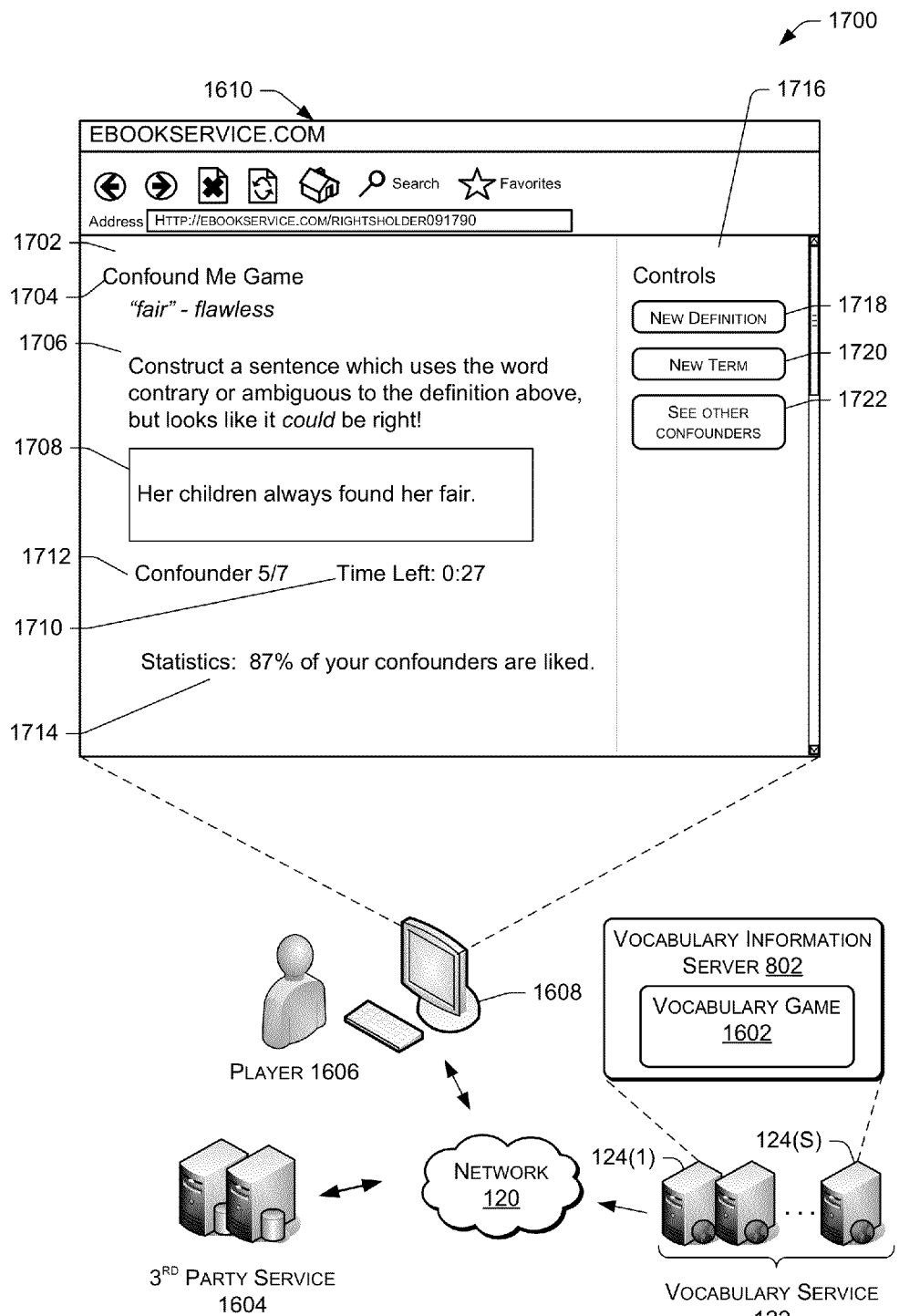

FIG. 17 illustrates a further example of the architecture 1600 in which the vocabulary service 122 further supports a network-based vocabulary game 1702 to generate confounders for vocabulary questions.

The player 1606 accesses the network-based vocabulary game 1702 via the computer 1608. In some implementations, the game is delivered over the Internet according to web-based protocols, such as HTTP. The computer 1608 executes a browser (or other rendering application) to request and receive pages, which are rendered to provide a game UI 1610. In other implementations, the game maybe delivered over other types of networks using the same or different protocols.

The game UI 1610 includes a title 1702 (e.g., "Confound Me Game") and the current definitions of the term. In this example, the term is "fair" and the definition for which a confounder is sought is "flawless." Also presented is a question region 1706 to present information about confounder questions. A user input area 1708 allows entry of the proposed confounder question. For example, here the user entered "Her children always found her fair." This is a confounder because it the appropriate definition of "fair" in this scenario is ambiguous.

The game presented here challenges the user to generate confounders which will mislead a reader. The first term and definition is presented when the player 1606 starts the game. A timer 1710 is initiated to provide a countdown of the time remaining. As the player responds to each question, a next term and definition is presented and a confounder count 1712 is maintained to let the player understand how many confounders are left to be completed in the allotted time 1710. Statistics 1714 about the response of other readers to the confounders are also presented.

A control area 1716 arranged as a vertical column may also be presented in the UI 1610. These controls allow the user to make changes to the game, seek help, and so forth. A user actuable control to select a new definition 1718 is present. With this control, the user may pick another definition to work on for the current work, for example, changing to the definition of "impartial." A new term 1720 control allows selection of another term. This term may be selected from those used to generate the user's vocabulary questions, or from other users.

Also, the user may have difficulty in visualizing confounders for this term. A see other confounders 1722 control is present to update the UI 1610 to show some other confounders which have been previously entered.

Other variations of the game are possible. In one such variation the user may generate an incorrect but plausible alternative definition for a term. For example, the user might define generate a false definition of fair as "a free outdoor show." Once generated, vocabulary questions may incorporate the confounders.

Illustrative System

Figure 18:
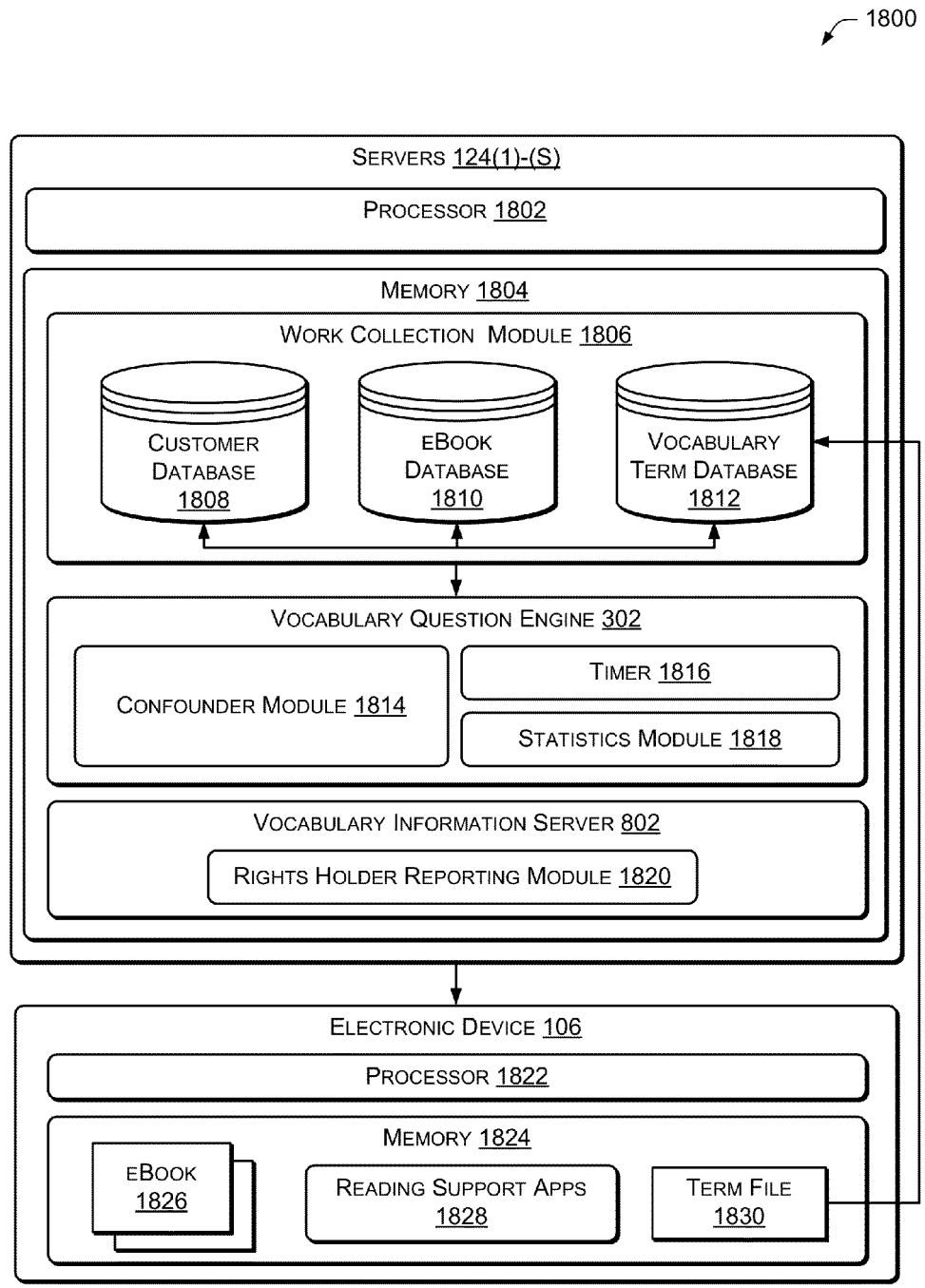
FIG. 18 is a block diagram illustrating selected modules in a computing system that implements determination of meaning of terms and generation of the vocabulary questions for those terms.

FIG. 18 shows selected modules in a representative computer system 1800 that may be used to collect terms of interest to readers, and generate vocabulary questions for those terms to test the readers' understanding. The system 1800 includes the servers 124(1)-(S) of the vocabulary service 122 and the electronic devices, as represented by an electronic device 106, from FIG. 1. The servers 124(1)-(S) collectively provide processing capabilities 1202 and memory 1804. The memory 1804 may include volatile and nonvolatile memory, removable and non-removable computer-readable storage media implemented in any type or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Stored in the memory 1804 is a digital work collection module 1806, which defines multiple databases. In this example, the digital work collection module 1806 includes a customer database 1808, an eBook database 1810, and a vocabulary term database 1812. The customer database 1808 contains information about readers 102(1)-(N) in the reader population 104. The eBook database 1810 maintains a collection of eBooks that may be accessed and delivered to the readers' electronic devices 106. The vocabulary database 1812 stores the vocabulary terms captured by the readers while reading eBooks on the devices 106. The terms are stored in association with the eBook from which the term was extracted, along with an identity of the reader and/or device, in a data structure 126 maintained within the vocabulary database 1812.

The vocabulary question engine 302 is shown embodied as a software module that is stored in the memory 1204 and executable by the processor 1802. The vocabulary engine 302 receives terms from the electronic device 106 that the reader expressed, implicitly or explicitly, an interest in learning. For instance, the reader may have requested a definition of the term, or highlighted the term, or annotated the work, or engaged in some other activity indicative of interest in the term. When the term is received from the device 106, it is stored in the vocabulary term database 1812 in association with the eBook from which the reader noted the term.

The vocabulary question engine 302 generates questions for the terms in the vocabulary term database 1812. The questions may be in many different formats, such as multiple-choice, fill-in-the-blank, true/false, or open ended. In some cases, the vocabulary question engine 302 may use portions of the text in the eBook to state a question. In this situation, the vocabulary question engine 302 identifies the associated eBook from the vocabulary term database 1812, and accesses the eBook from the eBook database 1810. The vocabulary question engine 302 restates the excerpt in the form of a question to test the reader's comprehension of the term. The vocabulary engine may then serve the vocabulary question back to the electronic device 106 from which the term was originally received. The identity of the electronic device is discovered in the data structure 126 maintained in the database 1812.

The vocabulary question engine 302 may include a confounder module 1814 which produces a set of confounders for multiple-choice questions. For instance, the confounder module 1814 may choose synonyms and antonyms of the term being tested. The confounder module 1814 may further choose otherwise correct dictionary definitions of the term, but which are incorrect in the context of the eBook from which the term was selected. For instance, the term "blue" may mean a color, but when used in the eBook the term meant an emotional state.

A timer 1816 is provided to time the reader's response time. The timer 1816 measures the time period between a time when a reader is presented with vocabulary question and a time when the reader submits a response. The timer may further time an overall testing duration when a reader is presented with multiple questions.

The vocabulary question engine 302 may also implement a statistics module 1818 to compute various measurements of relating to which terms are selected, accuracy of the reader's responses, and so forth. For instance, the statistics module 1818 may ascertain which terms are looked up most frequently, which terms are highlighted or annotated most often, which terms the reader correctly or incorrectly answers corresponding questions, and so forth. The statistics module 1818 may further compute these statistics relative to books, such as the most frequently cited terms in the eBook, or top ten books in which a particular term is looked up. Furthermore, similar statistics can be measured relative to the reader or eBook device. For example, the statistics module 1818 may compute the reader's top ten terms most often looked up or highlighted.

The vocabulary information server 802 is shown embodied as a software module that is stored in the memory 1804 and executable by the processor 1202. The server 802 provides vocabulary information to facilitate a deeper understanding of the terms, thereby enriching the reader's learning experience. In one implementation, the server 802 serves the information in pages that, when rendered on a browser or other application, provide an interactive UI with data and references about various vocabulary terms. One example UI 806 is shown in FIGS. 8-11. The server 802 may also include a rights holder reporting module 1820, which provides aggregated results to rights holders, such as authors, publishers, agents, heirs, estates, and so forth. The reporting module 1820 may provide such information as which terms are most often looked up by the readers in the book. This may provide some insight as to the reader's ability to understand the work.

The servers 124(1)-(S) communicate with one or more devices 106(1)-(D), as represented as device 106 in FIG. 18. The device 106 has a processor 1822 and memory 1824 (e.g., volatile, non-volatile, etc.). One or more eBooks 1822 may be stored in the memory 1824 and renderable by the processor 1822 on a display. The device 106 may further include various reading support applications 1828 that aid during a reader's consumption of the eBook. For instance, the support applications 1828 may be a dictionary, a thesaurus, a highlighting tool, an annotation tool, and so forth. When the reader invokes one or more of the reading support applications 1828, the terms at the center of the activity are captured and stored in a term file 1830 in association with the eBook from which it was extracted and the identity of the reader and/or device 106. The file 1830 may then be passed to the servers 124(1)-(S), where it is stored in the vocabulary term database 1812.

In other implementations, the vocabulary question engine 302 may be stored and executed on the electronic device 106. In this way, the vocabulary questions are automatically generated locally based on the terms that the reader has indicated an interest. Once created, the vocabulary questions may then be stored in the memory 1824 and recycled from time-to-time.

Illustrative Operation

Figure 19:
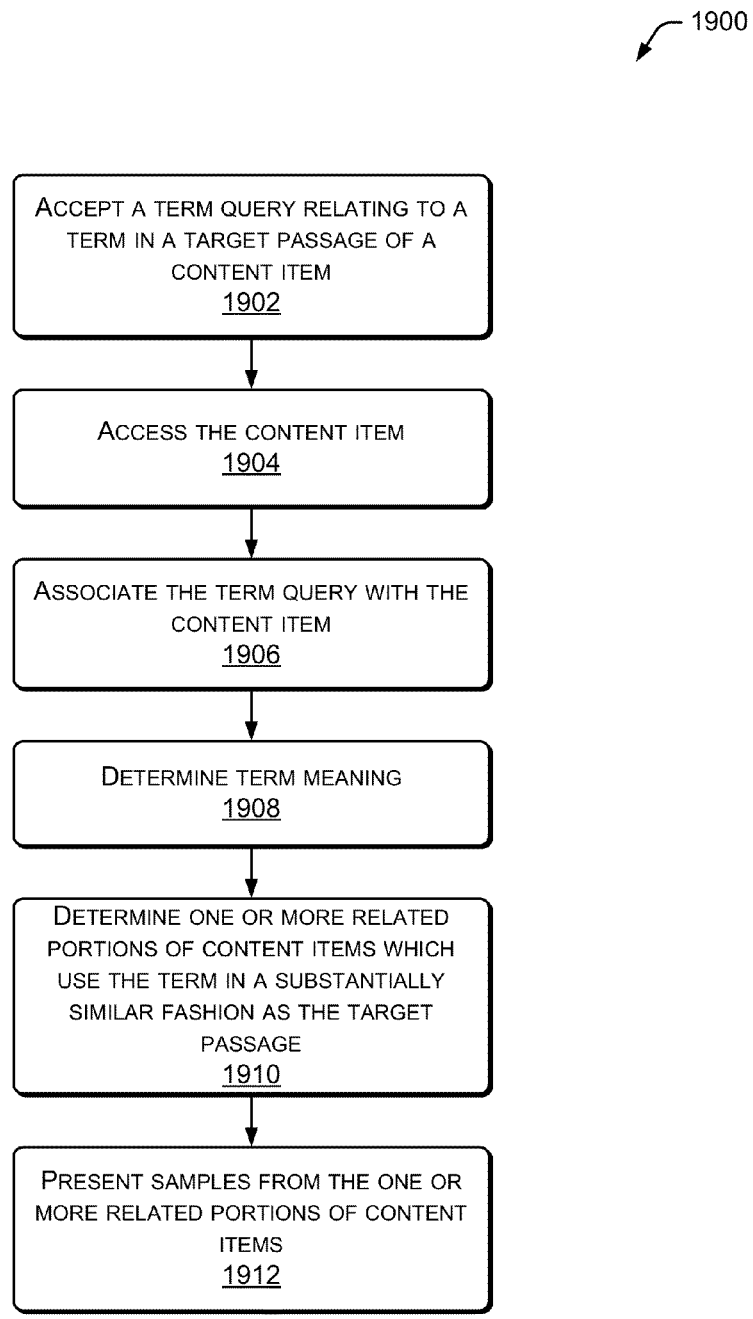
FIG. 19 is a flow diagram for a general process of accepting a query term and presenting context-appropriate samples of the query term.

FIG. 19 shows a general process 1900 of accepting a query term and presenting context-appropriate samples of the query term. The process 1900 (as well as the process 2000 of FIG. 20) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 1900 (as well as the process 2000 below) is described with reference to the architectures and computing system described above.

At 1902, a term query relating to a term in a target passage of a content item is accepted. In the architecture 100 of FIG. 1, for example, the term query is captured by the electronic devices 106(1)-(D) as the reader selects.

At 1904, the contents of the content item and metadata are accessed. As shown in FIG. 18, an eBook database 1810 may provide this information about the content item.

At 1906, the term query is associated with the content item. As shown in FIGS. 1 and 3, a data structure 126 may be implemented to associate the term with the eBook, reader, and/or device.

At 1908, the term meaning is determined. The process of determining the query term meaning is described in more detail next with regards to FIG. 20. This determination may include analysis of the content item as well as comparisons involving the metadata as shown in FIG. 2.

At 1910, one or more related portions of content items which use the term in a substantially similar fashion as the target passage are determined. As discussed above in FIG. 14, these works may be chosen for having a definition which is consistent with that encountered within the target passage and also being within books relevant to the user.

At 1912, samples from the one or more related portions of content items are presented. For example, the UI depicted in FIG. 14 shows relevant examples with the substantially similar or the same definition as used in the target passage.

Figure 20:
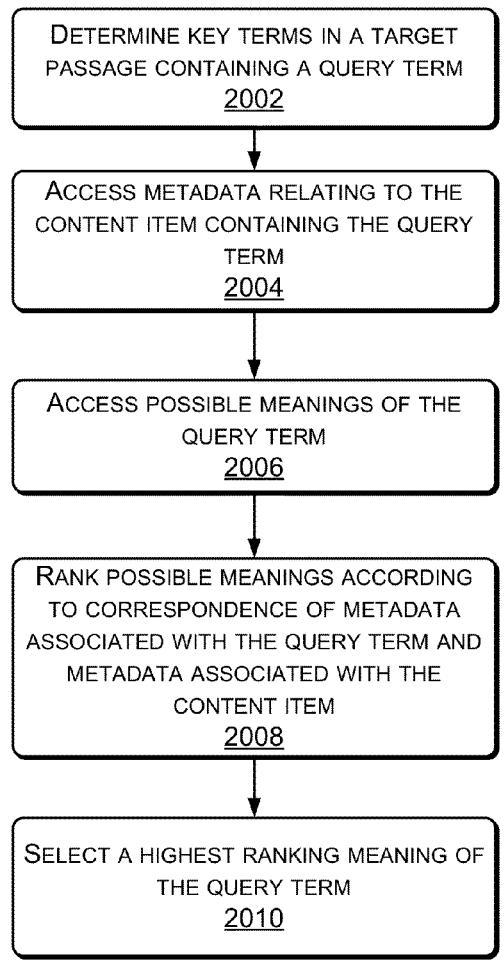
FIG. 20 is a flow diagram for a general process of determining a meaning of a selected query term at least in part due to a correspondence between metadata of the content in which the selected term resides and the metadata of the query term.

FIG. 20 is a flow diagram for a general process 2000 of determining a meaning of a selected term at least in part due to a correspondence between metadata of the content in which the selected term resides and the metadata of the term.

At 2002, key terms in a target passage containing a query term are determined. These key terms may be individual terms, or a combination of terms into a phrase.

At 2004, metadata relating to the content item containing the query term is accessed. As described above with respect to FIG. 2 this metadata may include publication year, author, genre, comparable books, and so forth.

At 2006, possible meanings of the query term are accessed. This access may include querying the vocabulary information server 802.

At 2008, possible meanings are ranked according to correspondence of metadata associated with each meaning and the metadata of the content item. In some implementations, correspondence with metadata of other content items may also be incorporated. For example, a meaning which has metadata indicating its origin was during the 16$^{th}$ century would receive a higher ranking when the query originates from the electronic book *Romeo and Juliet* published at about that time than when the query originates from a more recent book such as *The Art of the Deal*.

At 2010, the highest ranking meaning of the query term is selected. This selected meaning may then be presented to the user, such as via the interface of FIG. 14.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   under control of one or more computers configured with specific executable instructions,
   accepting a query for a term in a target passage within an electronic book;
   accessing the electronic book;
   associating the term with the electronic book;
   accessing possible meanings of the term; and
   determining a top ranking meaning of the term from the possible meanings, the top ranking meaning based at least in part upon metadata associated with contents of the associated electronic book and metadata associated with the term.

2. The computer-implemented method of claim 1, further comprising determining one or more related portions of one or more other electronic books, the one or more related portions using the term consistent with the top ranking meaning in the target passage within the electronic book.

3. The computer-implemented method of claim 1, further comprising presenting the determined term meaning.

4. The computer-implemented method of claim 1, the determining the top ranking meaning of the term further comprising:
   ranking the possible meanings according to correspondence of the metadata associated with the term and the metadata associated with the contents of the associated electronic book; and
   selecting the meaning of the term with a highest ranking.

5. The computer-implemented method of claim 1, further comprising presenting a confounder passage in which the term is used with a meaning other than the top ranking meaning of the target passage, and presenting a question to a user, the question being associated with.

6. The computer-implemented method of claim 1, further comprising presenting a report displaying variation of meaning of the term within a pre-determined set of parameters.

7. The computer-implemented method of claim 6, wherein the pre-determined set of parameters comprise:
   a range of dates;
   a user demographic;
   genre; or
   a combination thereof.

8. The computer-implemented method of claim 2, further comprising presenting the one or more related portions.

9. A computer-implemented method, comprising:
   under control of one or more computers configured with specific executable instructions,
   receiving a query for a term from a user accessing a content item on an electronic book reader device;
   accessing metadata associated with the user, the term, and the content item;
   ranking the possible meanings according to correspondence of metadata associated with the term and metadata associated with the content item;
   determining a top ranking meaning of the term from possible meanings based at least in part upon the metadata associated with the term and the metadata associated with the content item; and
   selecting the meaning of the term with a top ranking.

10. The computer-implemented method of claim 9, further comprising presenting one or more sample passages containing the top ranking meaning of the term from one or more content items in a corpus.

11. The computer-implemented method of claim 10, wherein the corpus of content items comprises electronic books.

12. The computer-implemented method of claim 9, further comprising presenting one or more sample passages containing non-top ranking meanings of the term from one or more content items in a corpus.

13. The computer-implemented method of claim 9, further comprising receiving a selection from the user to confine the query to a specified metadata attributed.

14. The computer-implemented method of claim 9, wherein the query is received from a dedicated electronic book reader.

15. A computer-implemented method, comprising:
   under control of one or more computers configured with specific executable instructions,
   determining a meaning of a term within the context of a passage in a target content item;
   presenting the term and an associated definition appropriate to the context;
   receiving an input containing the term as used in an incorrect fashion as a confounder;
   storing the confounder;
   causing a presentation of the confounder to a user as part of a vocabulary question; and
   ranking the confounder based at least in part on a frequency with which the confounder is selected when the confounder is part of the vocabulary question.

16. A computer-implemented method, comprising:
   receiving, from an electronic device, a term in a target passage for which a reader has initiated a query while reading an electronic book on the electronic device;
   determining a top ranked meaning of the term based at least in part upon the context of the target passage and metadata associated with the electronic book;
   generating a vocabulary question for the term with the meaning as used in the target passage; and
   serving the vocabulary question for presentation to the reader.

17. The computer-implemented method of claim 16, wherein the electronic device comprises an electronic book reader device.

18. The computer-implemented method of claim 16, wherein generating a vocabulary question comprises determining one or more excerpts of another electronic book using a same term with one or more non-top ranked meanings, and crafting a vocabulary question that includes at least a portion of the excerpt.

19. The computer-implemented method of claim 16, wherein generating a vocabulary question comprises enabling the reader to create the vocabulary question.

20. The computer-implemented method of claim 16, wherein serving the vocabulary question comprises serving the vocabulary question to the electronic device for display on the electronic device.

21. The computer-implemented method of claim 16, further comprising prompting the reader for feedback as to quality of the vocabulary question.

22. The computer-implemented method of claim 18, further comprising creating an audible version of the vocabulary question.

23. A device, comprising:
   a processor;
   a vocabulary service module stored in a memory coupled to the processor, the vocabulary service module configured to:
      receive a query from a querying entity about a term in a target passage of a content item within an electronic book;
      access metadata associated with the querying entity, the term, and the content item containing the target passage;
      determine a most likely meaning of the term as attributed to the querying entity based, at least in part, upon analysis of the metadata and a rank of possible meanings by a ranking module;
      search a corpus based at least in part upon the most likely meaning, and
      generate a vocabulary question based at least in part upon the determined most likely meaning.

24. The electronic device of claim 23, wherein the ranking module is configured to:
   access possible meanings of the term;
   rank the possible meanings according to correspondence of the metadata; and
   select the possible meaning of the term with a highest rank.

25. The electronic device of claim 23, wherein the corpus comprises a plurality of content items.

26. The electronic device of claim 23, the vocabulary service module further configured to present the determined most likely meaning.

27. The electronic device of claim 23, the vocabulary service module further configured to generate a vocabulary question based at least in part upon the determined most likely meaning.

* * * * *